(12) United States Patent
Kuriyama

(10) Patent No.: US 6,228,125 B1
(45) Date of Patent: *May 8, 2001

(54) IMAGE PROCESSING APPARATUS FOR PARALLEL IMAGE PROCESSING AND METHOD THEREFOR

(75) Inventor: Masaaki Kuriyama, Machida (JP)

(73) Assignee: Minolta Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/748,966

(22) Filed: Nov. 13, 1996

Related U.S. Application Data

(63) Continuation of application No. 08/368,237, filed on Jan. 3, 1995, now abandoned, which is a continuation of application No. 08/007,248, filed on Jan. 21, 1993, now abandoned.

(30) Foreign Application Priority Data

Jan. 21, 1992 (JP) ........................................... 4-8176
Jan. 21, 1992 (JP) ........................................... 4-8177
Jan. 14, 1993 (JP) ........................................... 5-5097

(51) Int. Cl.$^7$ .................................................. G06K 9/54
(52) U.S. Cl. ........................................ 982/304; 382/234
(58) Field of Search ................................. 382/303, 304, 382/234; 348/305, 665, 316; 358/313, 457, 462; 355/40, 200; 708/174

(56) References Cited

U.S. PATENT DOCUMENTS

| | | | |
|---|---|---|---|
| 4,375,100 | * 2/1983 | Tsuji et al. | 371/38 |
| 4,614,967 | * 9/1986 | Sayanagi | 358/75 |
| 4,772,958 | * 9/1988 | Suzuki | 348/305 |
| 4,779,142 | * 10/1988 | Freeman et al. | 358/313 |
| 4,914,524 | * 4/1990 | Kimura | 358/462 |
| 5,003,380 | 3/1991 | Hirota | 358/75 |
| 5,014,329 | * 5/1991 | Rudak | 382/17 |
| 5,070,531 | * 12/1991 | Schuerman | 382/49 |
| 5,091,978 | 2/1992 | Hirota | 382/67 |
| 5,121,162 | * 6/1992 | Iwamoto | 355/218 |
| 5,191,623 | * 3/1993 | Moriya | 382/47 |
| 5,195,148 | * 3/1993 | Sugiura | 382/47 |

* cited by examiner

Primary Examiner—Matthew C. Bella
(74) Attorney, Agent, or Firm—Sidley & Austin

(57) ABSTRACT

An image reading apparatus reads every picture element of an original image, converts the as-obtained analog signals of the respective picture elements into image data which are multilevel digital signals, image-processes the converted image data, and outputs binary image data corresponding to the respective picture elements. The original image is divided into a plurality of picture element blocks which are repeated every one or plural basic units with a basic unit of one or plural picture elements being continuous in a main scanning direction. The image data of the divisional picture element blocks are subjected to image processing such as trimming, masking, simple binarization processing and pseudo half tone processing in a parallel manner. Thereafter the image data of the picture element blocks are combined with each other so that image data corresponding to the original image are outputted.

15 Claims, 45 Drawing Sheets

FIG. 18

|   |   |   |   |   |   |   |   |   |   |   |   |   |
|---|---|---|---|---|---|---|---|---|---|---|---|---|
| B | C | D | E | F | G | H | G | H | I | J | K | L | M |
| P | Q | R | S | T | U | V | U | V | W | X | Y | Z | 1 |
| 4 | 5 | 6 | 7 | 8 | 9 | 0 | 9 | 0 | A | B | C | D | E |
| H | I | J | K | L | M | N | M | N | O | P | Q | R | S |
| V | W | X | Y | Z | 1 | 2 | 1 | 2 | 3 | 4 | 5 | 6 | 7 |
| O | A | B | C | D | E | F | E | F | G | H | I | J | K |
| N | O | P | Q | R | S | T | S | T | U | V | W | X | Y |
| 2 | 3 | 4 | 5 | 6 | 7 | 8 | 7 | 8 | 9 | 0 | A | B | C |
| F | G | H | I | J | K | L | K | L | M | N | O | P | Q |
| T | U | V | W | X | Y | Z | Y | Z | 1 | 2 | 3 | 4 | 5 |
| 8 | 9 | 0 | A | B | C | D | C | D | E | F | G | H | I |
| L | M | N | O | P | Q | R | Q | R | S | T | U | V | W |

—DRSg

FIG. 22a

← SUBSCANNING   DM

| 4 | 6 | 9 | 14 |
|---|---|---|----|
| 16 | 11 | 1 | 7 |
| 10 | 13 | 3 | 5 |
| 2 | 8 | 15 | 12 |

MAIN SCANNING ↓

FIG. 22b

← SUBSCANNING   DM

| 60 | 90 | 135 | 210 |
|----|----|-----|-----|
| 240 | 165 | 15 | 105 |
| 150 | 195 | 45 | 75 |
| 30 | 120 | 225 | 180 |

MAIN SCANNING ↓

FIG. 23a

| ADDRESS | WINDOW NUMBER |
|---|---|
| 0 | 14 |
| 1 | 7 |
| 2 | 5 |
| 3 | 12 |
| 4 | 14 |
| 5 | 7 |
| 6 | 5 |
| 7 | 12 |
| 8 | 14 |
| 9 | 7 |
| 10 | 5 |
| 11 | 12 |
| 12 | 14 |
| 13 | 7 |
| 14 | 5 |
| 15 | 12 |
| 16 | 9 |
| 17 | 1 |

FIG. 23b

| ADDRESS | | | | | | | | WINDOW NUMBER |
|---|---|---|---|---|---|---|---|---|
| $A_7$ | $A_6$ | $A_5$ | $A_4$ | $A_3$ | $A_2$ | $A_1$ | $A_0$ | |
| X | X | 0 | 0 | X | X | 0 | 0 | 14 |
| X | X | 0 | 0 | X | X | 0 | 1 | 7 |
| X | X | 0 | 0 | X | X | 1 | 0 | 5 |
| X | X | 0 | 0 | X | X | 1 | 1 | 12 |
| X | X | 0 | 1 | X | X | 0 | 0 | 9 |
| X | X | 0 | 1 | X | X | 0 | 1 | 1 |
| X | X | 0 | 1 | X | X | 1 | 0 | 3 |
| X | X | 0 | 1 | X | X | 1 | 1 | 15 |
| X | X | 1 | 0 | X | X | 0 | 0 | 6 |
| X | X | 1 | 0 | X | X | 0 | 1 | 11 |
| X | X | 1 | 0 | X | X | 1 | 0 | 13 |
| X | X | 1 | 0 | X | X | 1 | 1 | 8 |
| X | X | 1 | 1 | X | X | 0 | 0 | 4 |
| X | X | 1 | 1 | X | X | 0 | 1 | 16 |
| X | X | 1 | 1 | X | X | 1 | 0 | 10 |
| X | X | 1 | 1 | X | X | 1 | 1 | 2 |

FIG. 38c

| LINE NUMBER | FIFO 3001 | FIFO 3002 | FIFO 3003 | FIFO 3004 |
|---|---|---|---|---|
| 0 | WRITE DATA OF 0TH LINE | HOLD DATA OF (N-2)TH LINE | DISCHARGE DATA OF (N-1)TH LINE | DISCHARGE DATA OF NTH LINE |
| 1 | HOLD DATA OF 0TH LINE | WRITE DATA OF 1ST LINE | α° | |
| 2 | DISCHARGE DATA OF 0TH LINE | DISCHARGE DATA OF 1ST LINE | α° | HOLD DATA OF NTH LINE |
| 3 | α° | | WRITE DATA OF 2ND LINE | WRITE DATA OF 3RD LINE |
| 4 | WRITE DATA OF 4TH LINE | HOLD DATA OF 1ST LINE | HOLD DATA OF 2ND LINE | DISCHARGE DATA OF 3RD LINE |
| 5 | HOLD DATA OF 4TH LINE | WRITE DATA OF 5TH LINE | DISCHARGE DATA OF 2ND LINE | α° |
| 6 | DISCHARGE DATA OF 4TH LINE | DISCHARGE DATA OF 5TH LINE | WRITE DATA OF 6TH LINE | HOLD DATA OF 3RD LINE |

WHERE
  n = 1,2
  m = 1,2,3,4

FIG. 42C

| LINE NUMBER | FIFO 7001 | FIFO 7002 | FIFO 7003 | FIFO 7004 |
|---|---|---|---|---|
| 0 | DISCHARGE DATA OF (N-1)TH LINE | WRITE DATA OF 0TH LINE | HOLD DATA OF N-TH LINE | WRITE DATA OF 1ST LINE |
| 1 | HOLD DATA OF (N-1)TH LINE | α˙ | DISCHARGE DATA OF N-TH LINE | α˙ |
| 2 | WRITE DATA OF 2ND LINE | DISCHARGE DATA OF 0TH LINE | WRITE DATA OF 3RD LINE | HOLD DATA OF 1ST LINE |
| 3 | α˙ | HOLD DATA OF 0TH LINE | α˙ | DISCHARGE DATA OF 1ST LINE |
| 4 | DISCHARGE DATA OF 2ND LINE | WRITE DATA OF 4TH LINE | HOLD DATA OF 3RD LINE | WRITE DATA OF 5TH LINE |
| 5 | HOLD DATA OF 2ND LINE | α˙ | HOLD DATA OF 3RD LINE | α˙ |

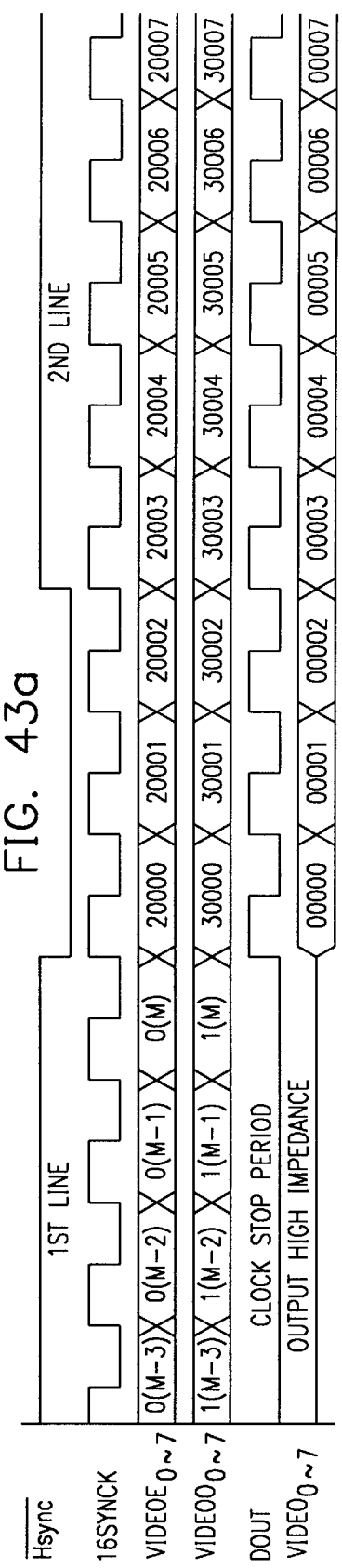
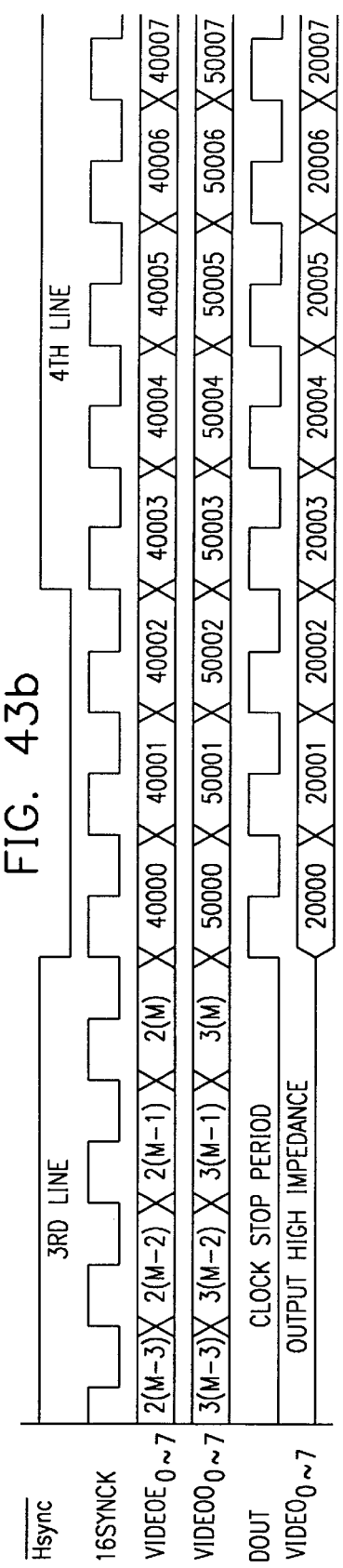
FIG. 43a
FIG. 43b

FIG. 44

```
                                                              10000d
                                                              5 4 3 2 1 0
                                                              [pattern block]
                                                              K PICTURE
                                                              ELEMENTS
                                                              FOR 1 LINE
                                                              →MAIN SCANNING
                                                               DIRECTION
                                                              ↓SUBSCANNING DIRECTION
```

10000a
5 4 3 2 1 0
K PICTURE ELEMENTS FOR 1 LINE
→ MAIN SCANNING DIRECTION
↓ SUBSCANNING DIRECTION 10000b
4 2 0
K PICTURE ELEMENTS FOR 1 LINE
→ MAIN SCANNING DIRECTION
↓ SUBSCANNING DIRECTION 10000c
5 3 1
K PICTURE ELEMENTS FOR 1 LINE
→ MAIN SCANNING DIRECTION
↓ SUBSCANNING DIRECTION

10001 READING/IMAGE PREPROCESSING
— 8 BITS FOR 1 PICTURE ELEMENT, K PICTURE ELEMENTS FOR 1 LINE →
10002 LINE SEPARATING UNIT
— 8 BITS FOR 1 PICTURE ELEMENT →
10003a PARALLEL IMAGE PROCESSING UNIT
— 1 BIT FOR 1 PICTURE ELEMENT, K PICTURE ELEMENTS FOR 1 LINE →
10003b PARALLEL IMAGE PROCESSING UNIT
— 1 BIT FOR 1 PICTURE ELEMENT, K PICTURE ELEMENTS FOR 1 LINE →
10004 LINE COMBINING UNIT
→ 10005 IMAGE POSTPROCESSING UNIT
— K PICTURE ELEMENTS FOR 1 LINE

SYNCK/Hsync      2SYNCK (16SYNCK)/2Hsync      8SYNCK/Hsync

NOTE) 10000a, 10000b, 10000c & 10000d REPRESENT READ LINE STATES, WITH NUMERALS REPRESENTING READ LINE NUMBERS.

IMAGE PROCESSING APPARATUS FOR PARALLEL IMAGE PROCESSING AND METHOD THEREFOR

This application is a continuation of application Ser. No. 08/368,237 filed Jan. 3, 1995, now abandoned, which, in turn, is a continuation of Ser. No. 08/007,248, filed on Jan. 21, 1993, and now abandoned.

BACKGROUND OF THE INVENTION

1. Field of the Invention

The present invention relates to an image reading apparatus for image-processing signals obtained by reading an original image and outputting image signals corresponding to the original image.

2. Description of the Background Art

In general, an image reading apparatus (image reader) for subdividing an original image into picture elements and reading the same is employed as an image input device for an apparatus such as a digital copying machine or facsimile, an OCR (optical character reader), an optical filing system or a display unit for forming, recording or displaying an image by combination of dots (picture elements) of constant sizes.

In such a conventional image reading apparatus, a one-dimensional image sensor extending in a main scanning direction is employed to scan an original image in a sub-scanning direction for reading the same, convert the as-obtained analog signals of respective picture elements to image data of multilevel digital signals, image-process the converted image data and output binary image data corresponding to the respective picture elements.

Image processing performed by such an image reading apparatus includes processing for improving image quality such as edge (contour) enhancement for making a clear image or smoothing for making a natural image, processing for image editing such as trimming, masking, negative-positive conversion, and binarization processing for converting multilevel data responsive to densities or colors of respective picture elements of an original to binary data.

In the binarization processing, the so-called simple binarization processing for comparing the multiple level of a single picture element with a constant threshold level is suitable for a line image such as a character in general, while pseudo gradation processing by a dither method or an error diffusion method is suitable for a half tone image such as a photograph, in consideration of the quality of the reproduced image.

In order to read an original containing both line and half tone images, therefore, the simple binarization processing and the pseudo gradation processing are switched in response to the attribute (this term may hereinafter be referred to as "binarization attribute") of the line or half tone image.

In the conventional image reading apparatus, image data obtained by reading an original are image-processed by a single image processor. For example, a simple binarization processing unit and a pseudo gradation processing unit are respectively provided for binarization processing, to perform simple binarization processing or pseudo gradation processing by one of the processing units on the image data inputted in parallel with reading of the original image.

However, the binarization processing requires a considerable time for fully comparing image data of respective picture elements with threshold levels. Particularly in the pseudo gradation processing, it is necessary to read threshold levels which are varied with positions (addresses) of the picture elements from a ROM or the like. Thus, the processing speed cannot be increased due to the time required for such an operation.

When an original contains a large amount of half tone images, therefore, the overall processing time is increased and the reading speed is reduced. When a large original such as an A2 original is read, for example, the reading speed is reduced due to increase in number of picture elements.

SUMMARY OF THE INVENTION

Accordingly, an object of the present invention is to improve processing efficiency in an image processing apparatus.

Another object of the present invention is to prevent an image processing apparatus from reduction of a processing speed even if a large-sized original is processed.

Still another object of the present invention is to improve an image processing speed as well as image quality in an image processing apparatus.

A further object of the present invention is to provide an image processing method with a high image processing speed.

The aforementioned objects of the present invention are attained by dividing image data for each respective line read by an image reading apparatus and processing the image data for a respective line in parallel with each other.

Since the image data are processed in parallel with each other, the processing speed is increased in the image processing apparatus.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 17 illustrates images obtained by reading the original by the image sensors;

FIG. 18 illustrates an image obtained by simply combining the images read by the image sensors;

FIG. 22 illustrates examples of 16-gradation dither matrices employed for ordinary processing;

FIG. 23 illustrates relations between addresses and window numbers of a dither ROM;

FIG. 38c is a table showing state changes of the FIFO memories;

FIG. 42c is a table showing state changes of the FIFO memories;

FIGS. 43a and 41b are timing charts showing control signals inputted in the FIFO memories;

FIG. 44 is a block diagram showing an operating concept in the second embodiment.

DESCRIPTION OF THE PREFERRED EMBODIMENTS (1) First Embodiment

Figure 1:
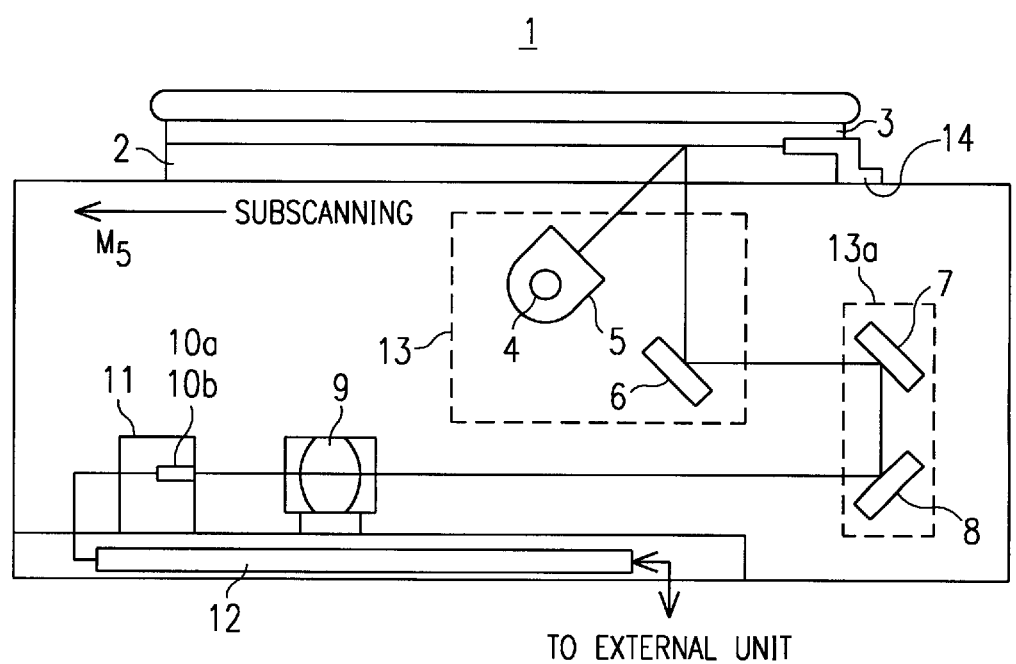
FIG. 1 is a front sectional view schematically showing the structure of an image reader according to a first embodiment of the present invention.

Referring to FIG. 1, an image reader 1 according to a first embodiment of the present invention is provided with a platen glass 2 which is mounted on an upper surface of a housing to be capable of receiving an A2 original at the maximum, and an original cover 3 for pressing an original which is placed on this platen glass 2. A reference pattern 14 which is formed by a white image for shading correction is provided on a front end portion of the platen glass 2 along a scanning direction.

The housing is provided therein with an optical system which is arranged to be capable of scanning an original image along arrow M5 (subscanning direction) under the platen glass 2, and an electric circuit unit 12 for generating image data in response to densities or colors of the original image.

The optical system is formed by a first slider 13 having an exposure lamp 4, a reflecting mirror 5 and a mirror 6, a second slider 13a having mirrors 7 and 8, a main lens 9 and the like. Assuming that the first slider 13 travels at a speed v, the second slider 13a is driven to travel at a speed of v/2.

Scanning light passing through the main lens 9 enters two image sensors 10a and 10b which are mounted on a support member 11 to be capable of reading an A3 original, and is converted to electric signals (image signals). Each of the image sensors 10a and 10b is formed by a plurality of CCD chips which are continuously arranged along the main scanning direction (line direction), to be capable of reading an original with a resolution of 400 picture elements per inch. Each CCD chip is provided with a number of photodetectors which are aligned with each other, while each photodetector is divided into three areas and a spectral filter is provided on the surface of each photodetector so that each divided area receives one of red, green and blue light components. Each photodetector, corresponding to each picture element of the original, outputs an image signal which is responsive to the intensity of reflected light with respect to the color of the picture element to the electric circuit unit 12.

Figure 2:
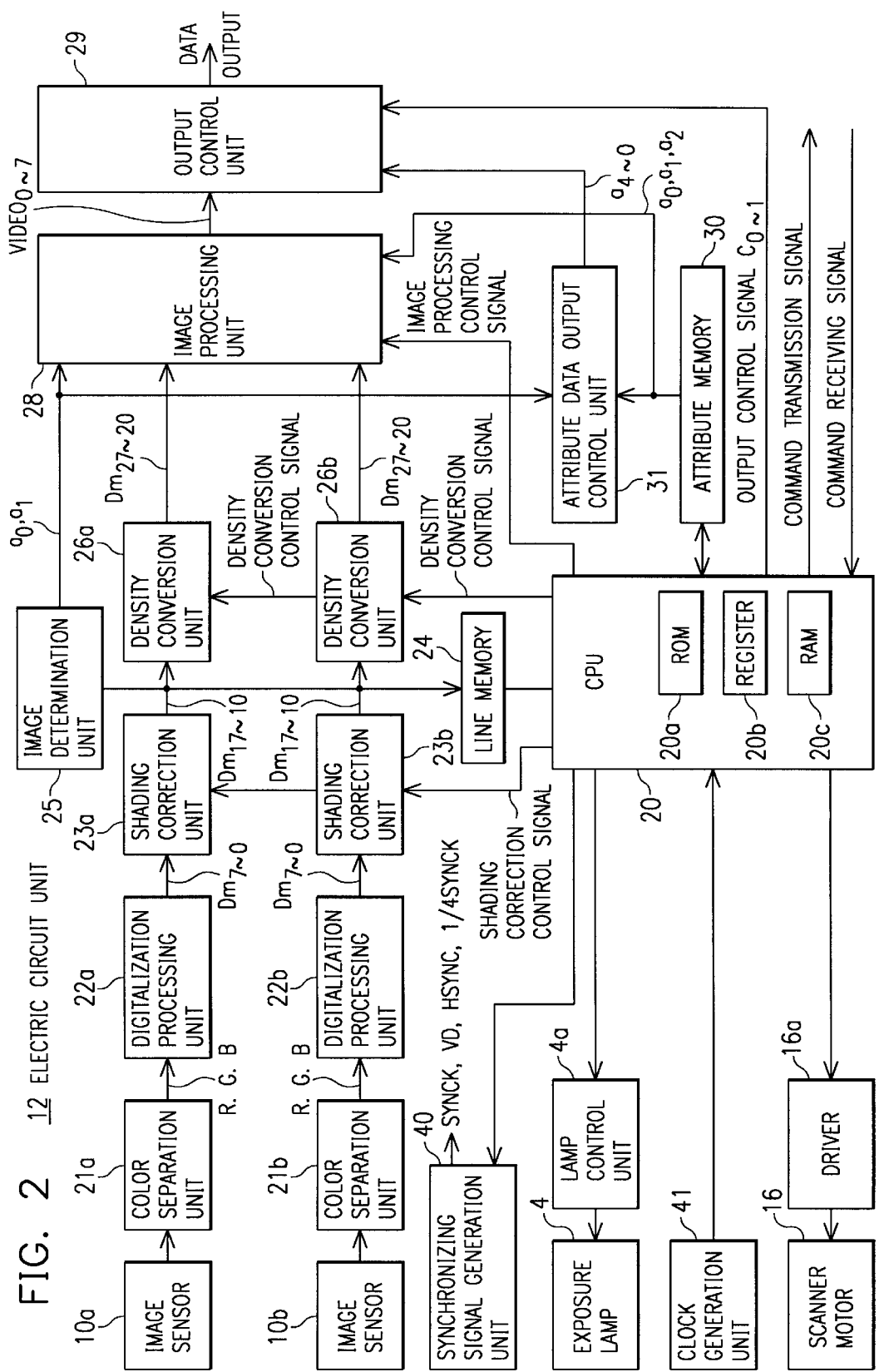
FIG. 2 is a block diagram showing an electric circuit unit of the image reader.

FIG. 2 is a block diagram showing the electric circuit unit 12 of the image reader 1 according to the first embodiment of the present invention.

The electric circuit unit 12 is formed by two color separation units 21a and 21b for separating the image signals received from the two image sensors 10a and 10b into signals of red, green and blue and amplifying the same in a prescribed manner, two digitalization processing units 22a and 22b for A-D converting (quantizing) the analog signals of the respective colors and outputting 8-bit image data Dm7 to Dm0 (m=0, 1), two shading correction units 23a and 23b for correcting uneven light intensities of the image data Dm0 to Dm7 in the main scanning direction and bit dispersion of the image sensors 10a and 10b, an image determination unit 25 for determining binarization attributes and color attributes, two density conversion units 26a and 26b for performing density level adjustment and gamma conversion in response to density characteristics (gamma characteristics) of an externally connected device, an image processing unit 28 for performing image processing including image edition processing and binarization processing, an output control unit 29 for controlling data outputs, an attribute memory 30 for storing specified attribute data a2 to a0, an attribute data output control unit 31, a clock generation circuit 41, a line memory 24 for storing image data Dm17 to Dm10 (m=0, 1) outputted from the two shading correction units 23a and 23b for one line, a synchronizing signal generation unit 40 for outputting various types of synchronizing signals to the respective units, a lamp control unit 4a for turning on the exposure lamp 4, a driver 16a for driving a scanner motor 16 for scanning, and a CPU 20 for controlling all of these units.

The CPU 20 contains a ROM 20a storing processing programs, and a register 20b and a RAM 20c for temporarily storing various flags and status data in execution of the programs. This CPU 20 communicates with an external host unit having an operation panel for transferring data indicating various commands (control command code data) and operating states (statuses) of the image reader 1, and generates the specified attribute data a2 to a0 defining image edition and binarization processing in advance of reading of the image, to store the same in the attribute memory 30.

In the image reader 1, the specified attribute data a0, a1 and a2 are adapted to define binarization processing, negative-positive inversion and trimming respectively.

The synchronizing signal generation unit 40 outputs synchronizing signals such as a horizontal synchronizing signal HSYNC which is outputted every main scanning line, a picture element clock signal SYNCK serving as a reference signal for data transmission timing every picture element, an enable signal VD showing a valid period of data output from the image reader 1, and the like.

The image determination unit 25 is adapted to determine character and photograph areas of an image, or a color edition specified portion.

The image determination unit 25 outputs determined attribute data $\alpha 0$ of "0" when a partitioned area E to be determined corresponds to a character image (character area), while the same outputs data $\alpha 0$ of "1" when the area E corresponds to a half tone image (photograph area). Further, the determined attribute data $\alpha 0$ is set at "1" when the partitioned area E to be determined corresponds to a specific color, while the same is set at "0" when the area E corresponds to a color other than the specific color.

Figure 3:
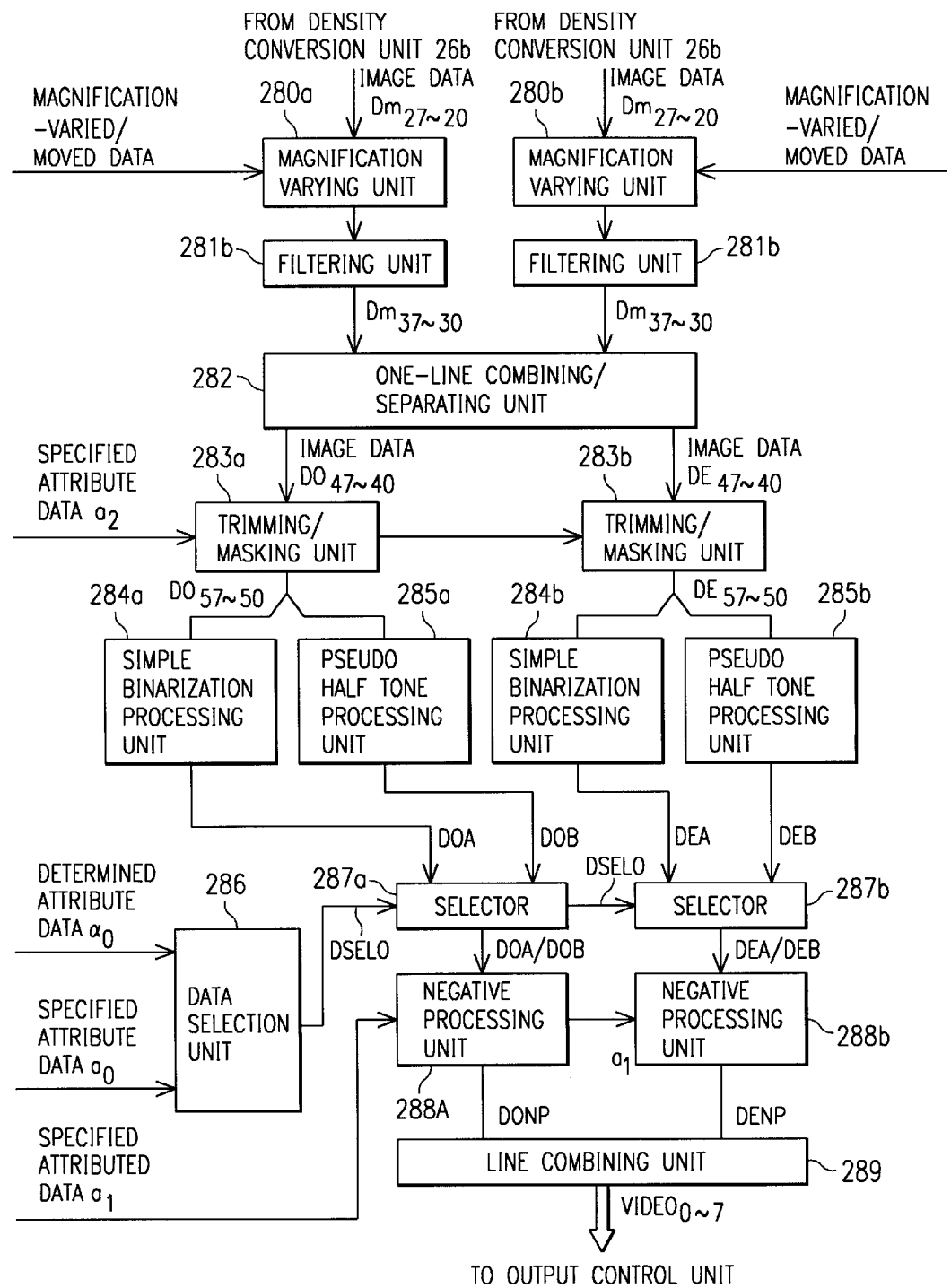
FIG. 3 is a block diagram showing an image processing unit.

Referring to FIG. 3, the image processing unit 28 is formed by magnification varying units 280a and 280b, filtering units 281a and 281b, a one-line combining/separating unit 282, trimming/masking units 283a and 283b, simple binarization processing units 284a and 284b, pseudo half tone processing units 285a and 285b, a data selection unit 286, selectors 287a and 287b, negative processing units 288a and 288b, and a line combining unit 289, in order to process the image signals received from the two image sensors 10a and 10b.

Two system image data Dm27 to Dm20 (m=0, 1) are serially inputted in the image processing unit 28 from the density conversion units 26a and 26b in order of arrangement of the picture elements. The inputted image data Dm27 to Dm20 are subjected to magnification varying processing in the magnification varying units 280a and 280b controlled by the CPU 20. Then the data are subjected to processing for quality improvement such as edge enhancement and smoothing in the filtering units 281a and 281b, and outputted as image data Dm37 to Dm30 (m=0, 1).

Then the one-line combining/separating unit 282 divides the two system image data Dm37 to Dm30, which have been half-split (line-divided) along the main scanning direction by the image sensors 10a and 10b, into image signals of odd picture elements and those of even picture elements for each respective line along the main scanning direction. Image data DO47 to DO40 and DE47 to DE40 divided into the odd and even picture elements are processed in dedicated processing units respectively, to be finally integrated into single image data VIDEO0 to VIDEO7 by the line combining unit 289.

Figure 4:
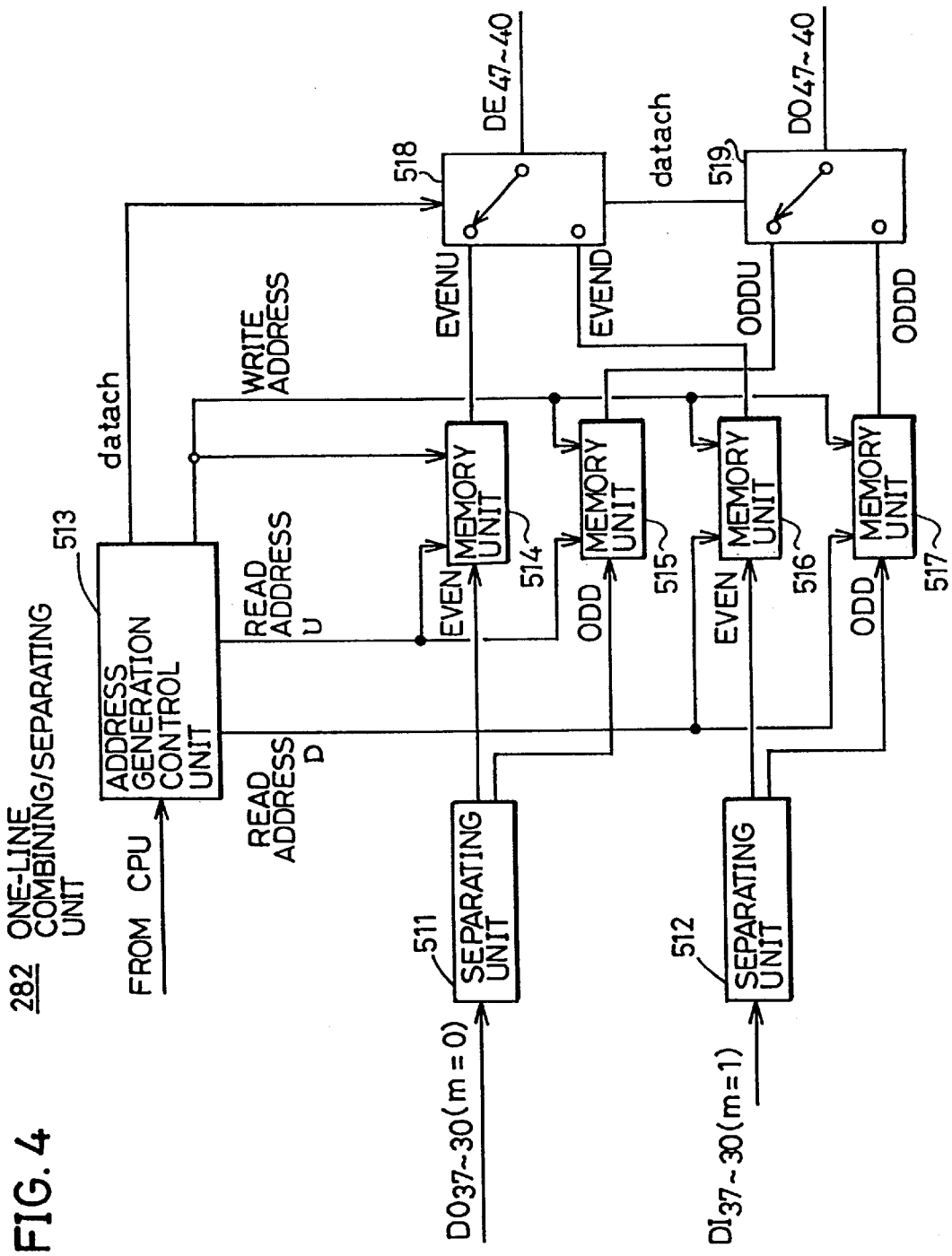
FIG. 4 is a block diagram showing a one-line combining/separating unit.

Referring to FIG. 4, the one-line combining/separating unit 282 is formed by separating units 511 and 512, an address generation control unit 513, memory units 514 to 517 and selectors 518 and 519.

The separating units 511 and 512 separate the two system image data Dm37 to Dm30, which are outputted from the two filtering units 281a and 281b for a respective line into four types of image data including those of the odd picture elements and those of the even picture elements.

The memory units 514 to 517, which are formed by RAMs each having a capacity for one line, store the image data in accordance with write addresses received from the address generation control unit 513 and read the stored image data in accordance with read addresses to output the same to the selectors 518 and 519 respectively. The memory units 514 and 515 store even picture elements and odd picture elements on a first half of one line respectively, while the memory units 516 and 517 store even picture elements and odd picture elements on a rear half of one line respectively.

The selectors 518 and 519 switch the image data outputted from the memory units 514 and 516 or 515 and 517 in response to a selector switching signal datach, and output the same as the image data DE47 to DE40 and DO47 and DO40 of the even and odd picture elements over one line.

Figure 5:
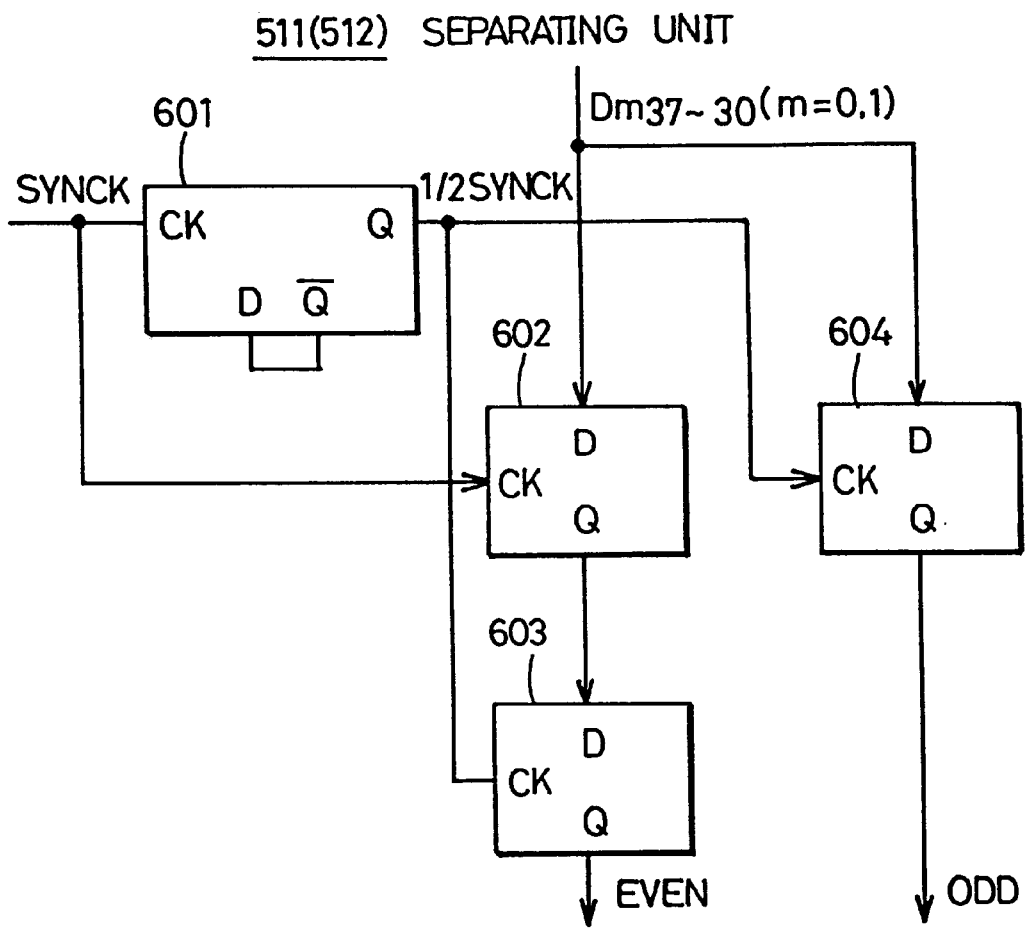
FIG. 5 is a block diagram showing a separating unit.
Figure 9:
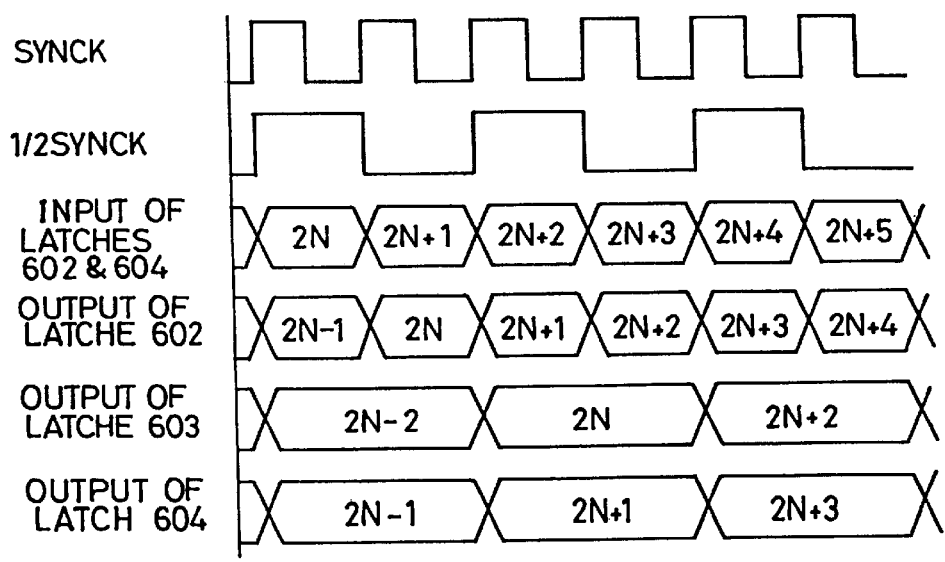
FIG. 9 is a timing chart showing states of signals in respective parts of the separating unit.

FIG. 5 is a block diagram showing the separating unit 511 or 512, and FIG. 9 is a timing chart showing states of signals in respective parts of the separating unit 511 or 512.

Each of the separating units 511 and 512 is formed by a frequency divider 601 which divides the picture element clock signal SYNCK for outputting a clock signal ½SYNCK, a D-latch 602 for delaying the image data Dm37 to Dm30 in timing by one picture element clock signal SYNCK, and latches 603 and 604 for latching the image data Dm37 to Dm30 every other picture element and outputting the same.

Data for odd (1st, 3rd, 5th, . . . ) picture elements of the image data Dm37 to Dm30 are latched by the latch 604 in synchronization with the clock signal ½SYNCK. Since the image data Dm37 to Dm30 are delayed by the latch 602 by one image clock signal SYNCK (one picture element), those for even (2nd, 4th, 6th, . . . ) picture elements are latched by the latch 603.

Thus, the latch 604 outputs those of the image data Dm37 to Dm30 for the odd picture elements, while the latch 603 outputs those of the image data Dm37 to Dm30 for the even picture elements.

The two system image data Dm37 to Dm30 thus separated into those for the odd and even picture elements are temporarily stored in the memory units 514 to 517, and thereafter line-integrated for the odd and even picture elements by the selectors 518 and 519 respectively.

The need for line combining is now briefly described.

Figures 16, 17A, 17B:
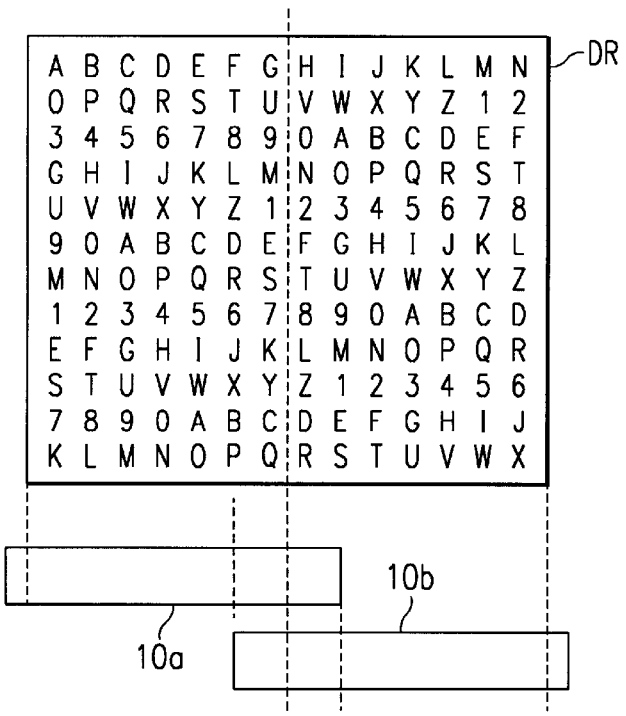
FIG. 16 illustrates positional relations between an original and image sensors.

FIG. 16 illustrates positional relations between an original DR and the image sensors 10a and 10b, FIG. 17 illustrates images DRSa and DRSb obtained by reading the original DR by the image sensors 10a and 10b, and FIG. 18 illustrates an image DRSg formed by simply combining the images DRSa and DRSb read by the image sensors 10a and 10b respectively.

In order to facilitate position control, the two image sensors 10a and 10b are so arranged that first end portions of reading areas thereof overlap with each other and second end portions widely extend beyond end portions of the original DR respectively.

Thus, the central portion of the original DR is doubly read by the image sensors 10a and 10b. If the images read by the image sensors 10a and 10b are simply combined with each other, therefore, no continuity is attained at this central portion as shown in FIG. 18. In order to prevent this, the outputs of the image sensors 10a and 10b may be switched along a boundary formed by specific picture elements in the central portion to delete one of the doubled images. This is the line integration.

Figure 6:
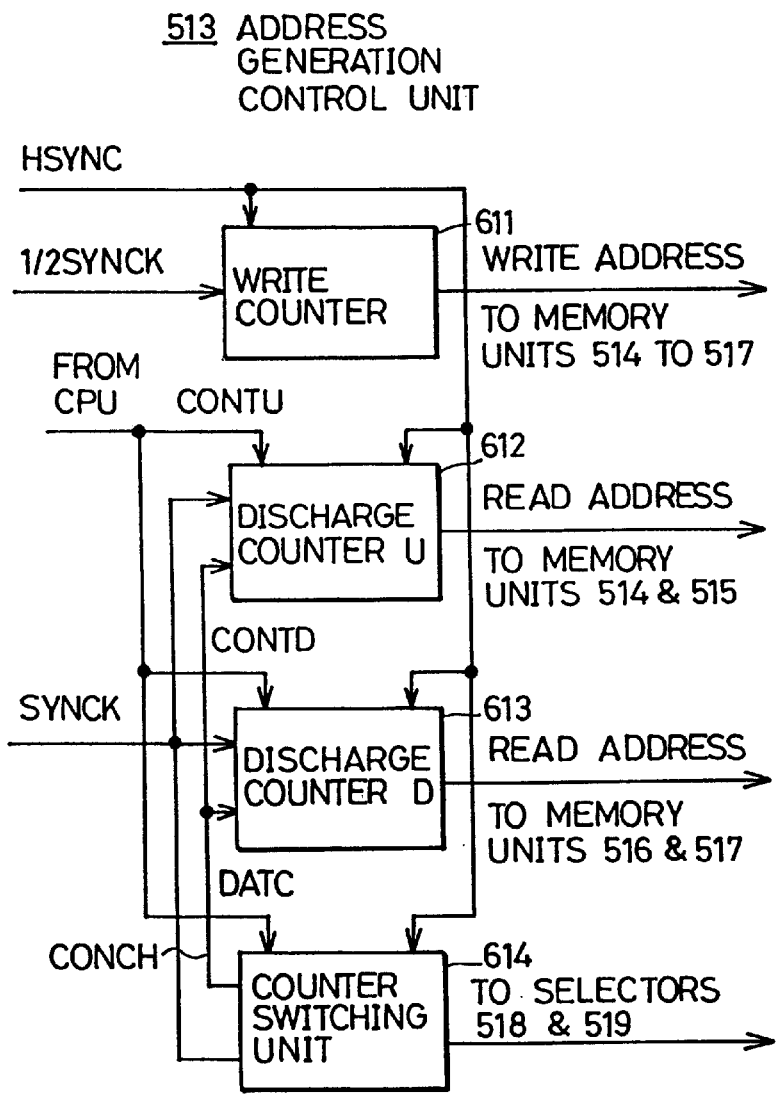
FIG. 6 is a block diagram showing an address generation control unit.
Figure 10:
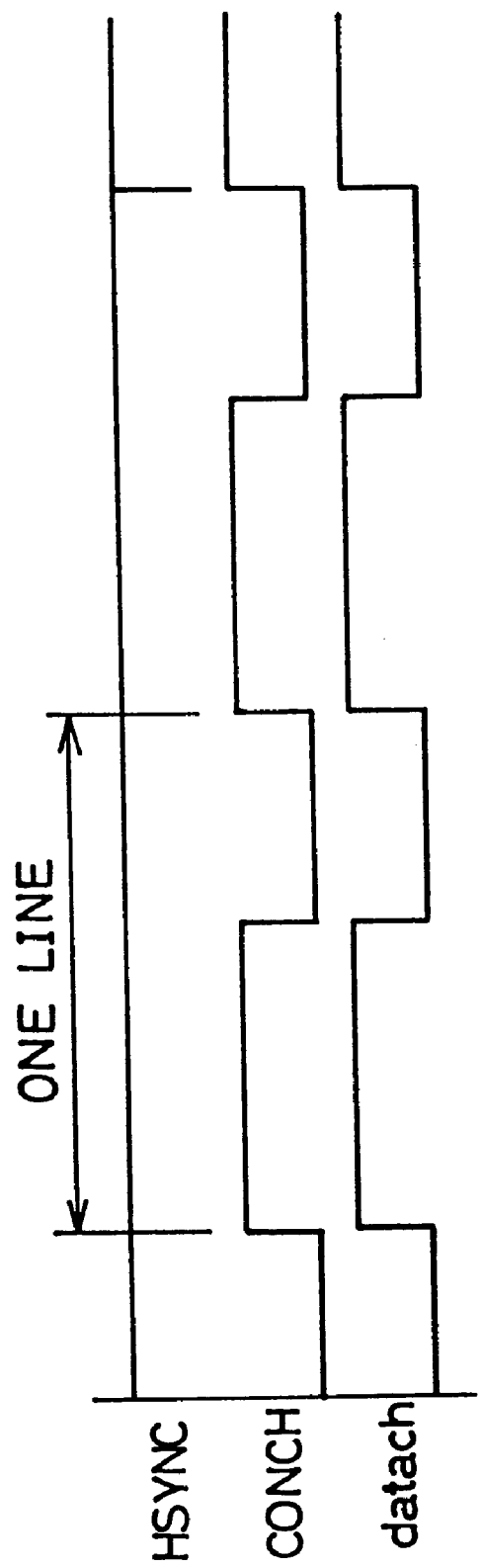
FIG. 10 is a timing chart showing states of signals in respective parts of the address generation control unit.
Figure 11A:
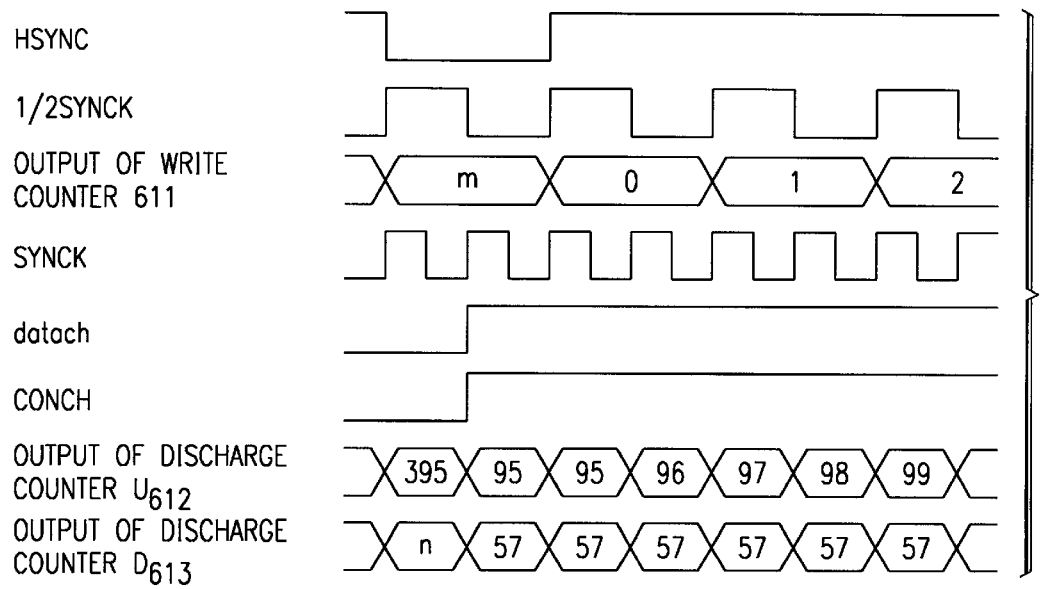
FIG. 11 illustrates timing charts showing states of signals in respective parts of the address generation control unit.
Figure 11B:
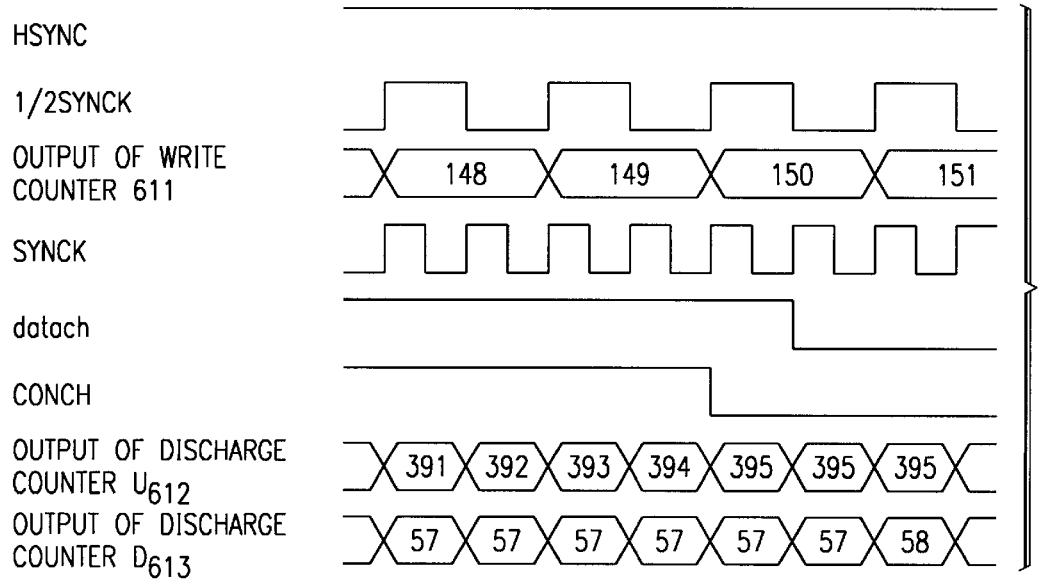
Figure 12:
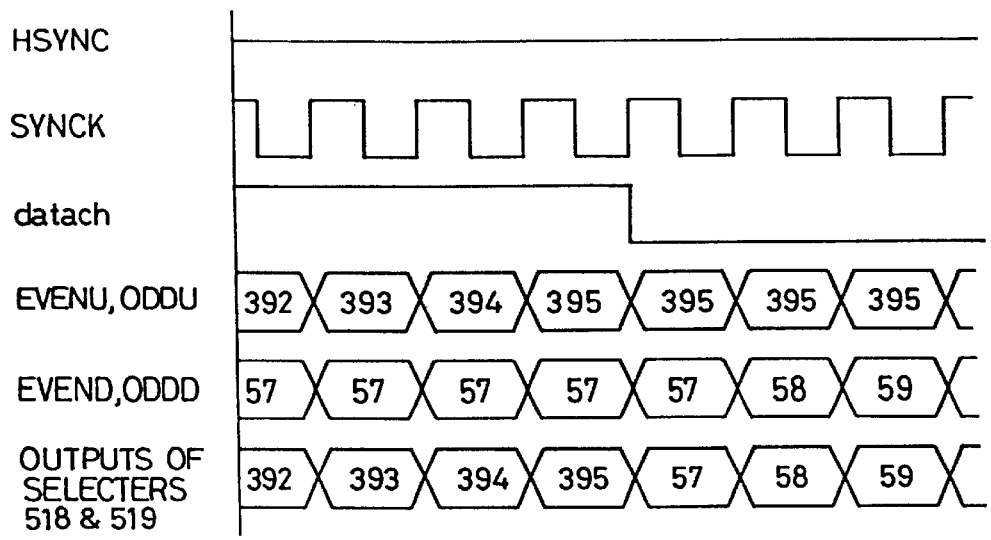
FIG. 12 is a timing chart showing states of signals in respective parts of the one-line combining/separating unit.

FIG. 6 is a block diagram showing the address generation control unit 513, FIGS. 10 and 11 are timing charts showing states of signals in respective parts of the address generation control unit 513, and FIG. 12 is a timing chart showing states of signals in respective parts of the one-line combining/separating unit 282 respectively.

The address generation control unit 513 is formed by a write counter 611, discharge counters U612 and D613, and a counter switching unit 614.

The write counter 611 counts the clock signal ½SYNCK having a cycle half that of the picture element clock signal SYNCK, and specifies write addresses of the memory units 514 to 517 by the count values. This write counter 611 is reset at "0" by the horizontal synchronizing signal HSYNC which is outputted every line.

The discharge counters U612 and D613, whose count initial values are set by the CPU 20 in response to the horizontal synchronizing signal HSYNC, count the picture element clock signal SYNCK from the set values. Initial values CONTU and CONTD are set at the discharge counters U612 and D613 respectively. As hereinafter described, the initial values CONTU and CONTD are numbers of the picture elements in the image sensors 10a and 10b.

The discharge counter U612 performs a count operation when a counter switching signal CONCH outputted from the counter switching unit 614 is in an ON state, while the other discharge counter D613 performs a count operation when the counter switching signal CONCH is in an OFF state. The counter switching signal CONCH is switched from an ON state to an OFF state at a boundary position of a substantially central portion in the overlapping areas of the image sensors 10a and 10b.

Substantially in synchronization with the counter switching signal CONCH, the selector switching signal datach is outputted for switching the selectors 518 and 519 in order to switch the image sensors 10a and 10b for line integration.

Referring again to FIG. 4, the selector 518 is connected with the memory units 514 and 516 storing the image data of the even picture elements, while the other selector 519 is connected with the memory units 515 and 517 storing the image data of the odd picture elements. In response to the selector switching signal datach, the selectors 518 and 519 output the image data read from the memory units 514 and 515 or 516 and 517 as the image data DE47 to DE40 and DO47 to DO40 respectively.

While the selectors 518 and 519 read the picture elements in the overlapping portions of the image sensors 10a and 10b from the memory units 514 and 515 respectively, the selector switching signal datach is switched to the image data read from the memory units 516 and 517, thereby outputting the image data DE47 to DE40 of the even picture elements and the image data DO47 to DO40 of the odd picture elements which are continuous over one line.

In the example shown in FIG. 11, the CPU 20 sets "95" as the initial value CONTU of the discharge counter U612, which starts counting when the counter switching signal CONCH is turned on as shown at (a), while the CPU 20 sets "57" as the initial value CONTD of the discharge counter D613, which starts counting when the counter switching signal CONCH is turned off, as shown at (b).

In the example shown in FIG. 12, on the other hand, the selector switching signal datach is turned off after the image data of the 395th picture element read by one of the image sensors 10a and 10b is outputted, and the selectors 518 and 519 output image data of the 57th picture element read by the other image sensor.

Thus, the image signals read by the two image sensors 10a and 10b are processed in a parallel manner in units of the sensors, divided into odd and even picture elements and then integrated over one line along the main scanning direction, and thereafter the odd and even picture elements are image-processed in a parallel manner. Consequently, it is possible to ensure the same processing speed as that in simple integration of serial image processing with no division into odd and even picture elements, without increasing the clock rate.

A method of integrating image data divided into odd and even picture elements over one line along the main scanning direction is now described in detail.

Figure 19:
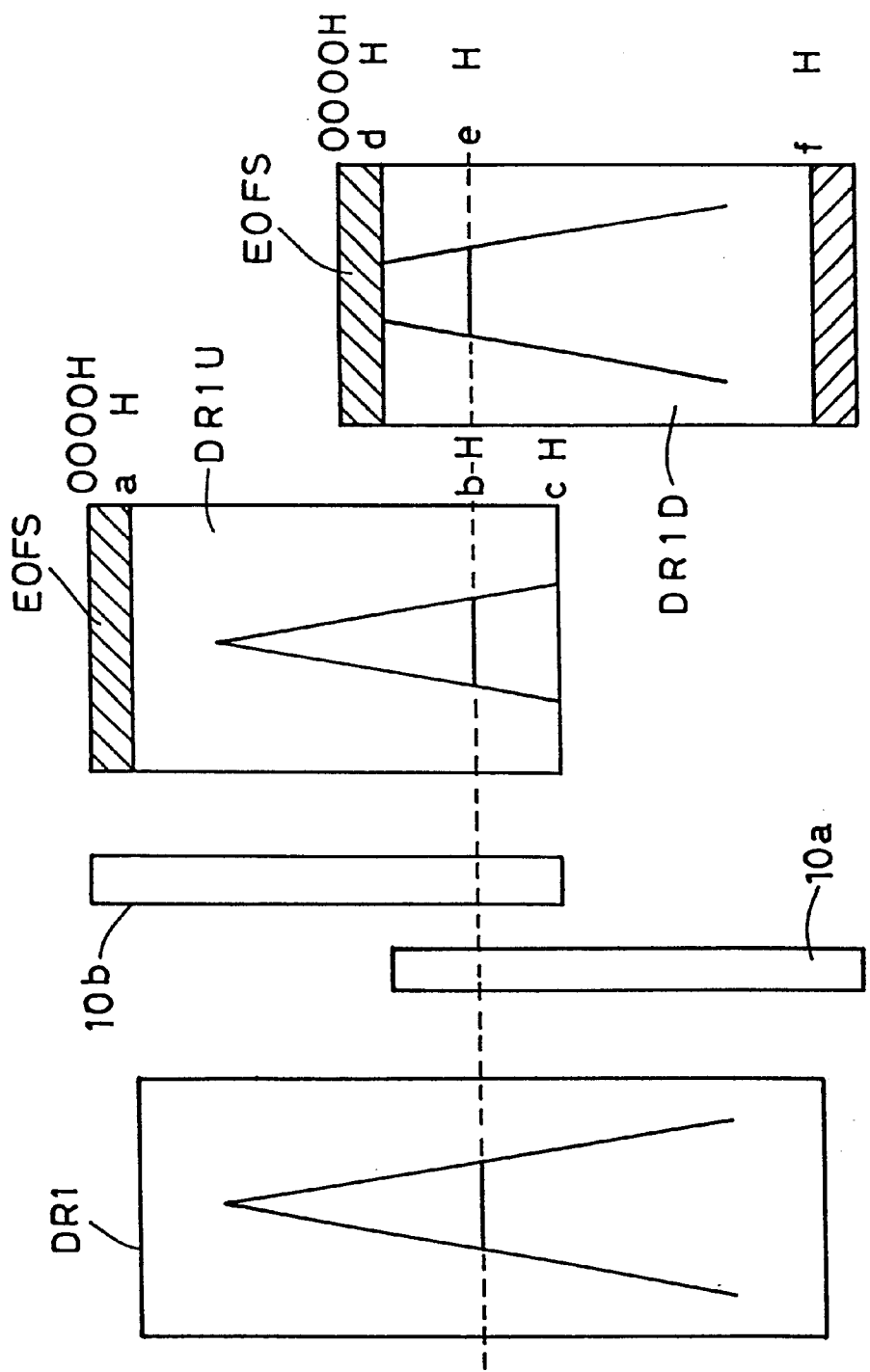
FIG. 19 illustrates typical relations between an original image and images stored in memory units.

FIG. 19 typically illustrates relations between an original DR1 and images DR1U and DR1D stored in the memory units 514 to 517.

The original DR1 is provided over its entire surface with an image of an alphabetic character "A", which is read by the two image sensors 10a and 10b. For every scanning line along the vertical direction in FIG. 19. The memory units 514 to 517 of the one-line combining/separating unit 282 store image data which are responsive to the upper and lower images DR1U and DR1D. The upper and lower images DR1U and DR1D are in an equal-scale magnification.

Due to the delay over the image sensors 10a and 10b and the memory units 514 to 517, offset areas EOFS are caused in initial portions of the addresses of the memory units 514 to 517. The as-read image data are stored behind the offset areas EOFS. When image processing circuits of the same structure are applied to the respective memory units 514 to 517, therefore, a=d, which can be experimentally (designingly) provided.

Further, central positions "b" and "e" of the image DR1 are designingly provided numerical values. Assuming that Y represents the number of data (number of picture elements) required after line integration such that 6614 picture elements are required for an A2 image of 400 dpi and 7200 picture elements are required for an image of 18×24 inches, for example, the CPU 20 sets a numerical value DATC in the counter switching unit 614 as follows:

$$DATC = Y/(2 \times 2)$$

$$= Y/4 \qquad (1)$$

Namely, each image sensor has charge of half the required number Y of picture elements, and the numerical value DATC is further halved since the images are divided into odd and even picture elements to be processed.

Further, the CPU 20 sets the initial values CONTU and CONTD in the discharge counters U612 and D613 for outputting the image data as to the images DR1U and DR1D respectively along the following equations (2) and (3):

$$CONTU = b - Y/4 \tag{2}$$

$$CONTD = e \tag{3}$$

The values "b" and "e" may not be halved since the images are already separated into the odd and even picture elements.

Thus, it is possible to perform one-line integration while dividing the image signals read by the two image sensors 10a and 10b into odd and even picture elements.

Description is now made on a case of reduction processing.

Figure 20A:
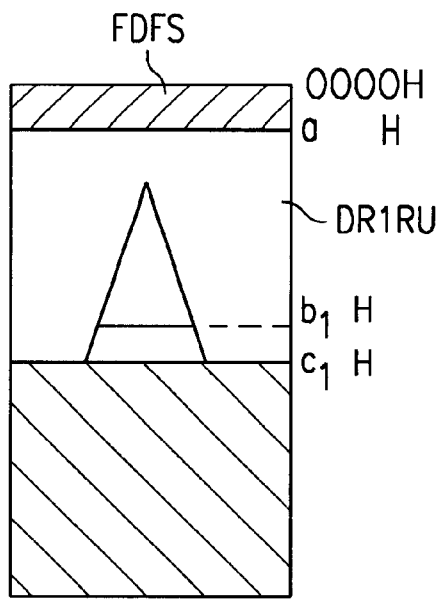
FIG. 20 illustrates typical images obtained by reducing the original image and stored in the memory units.
Figure 20B:
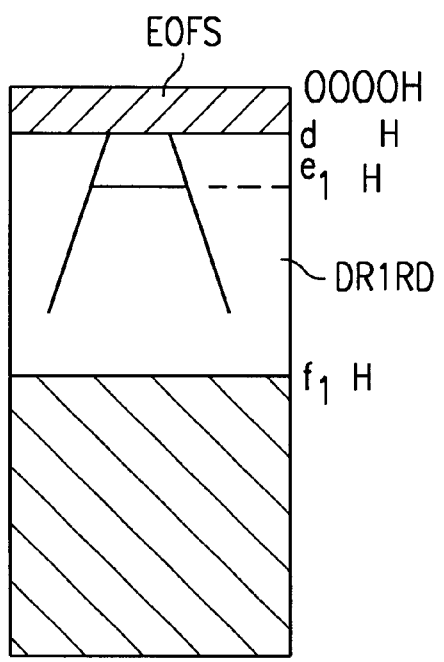
Figure 21A:
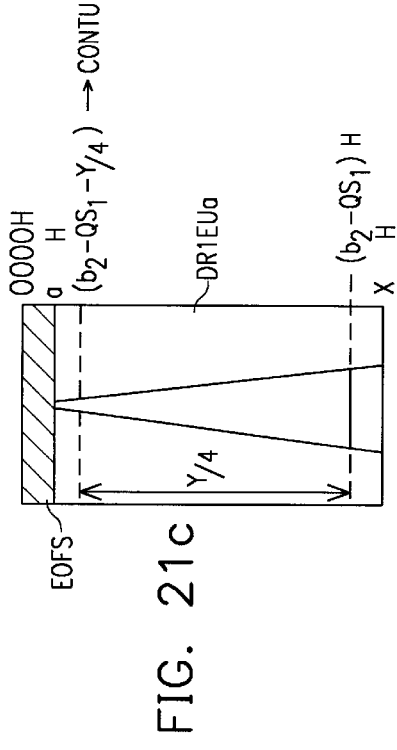
FIG. 21 illustrates typical images obtained by enlarging the original image and those stored in the memory units.
Figure 21B:
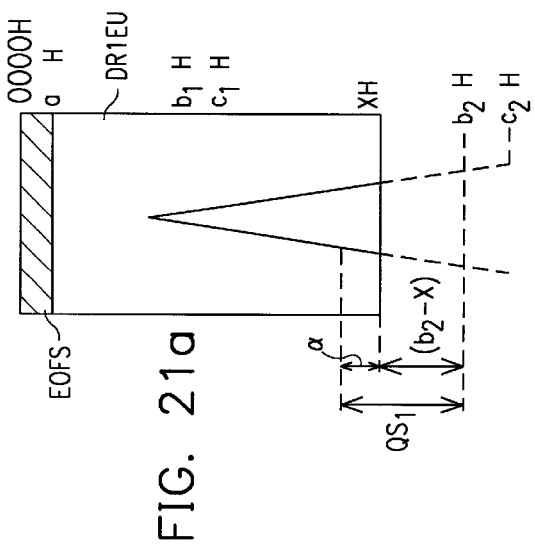
Figure 21C:
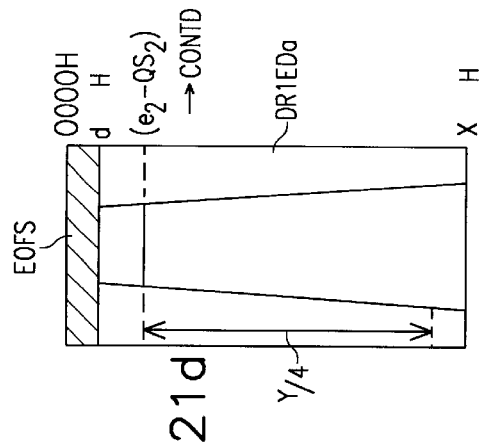
Figure 21D:
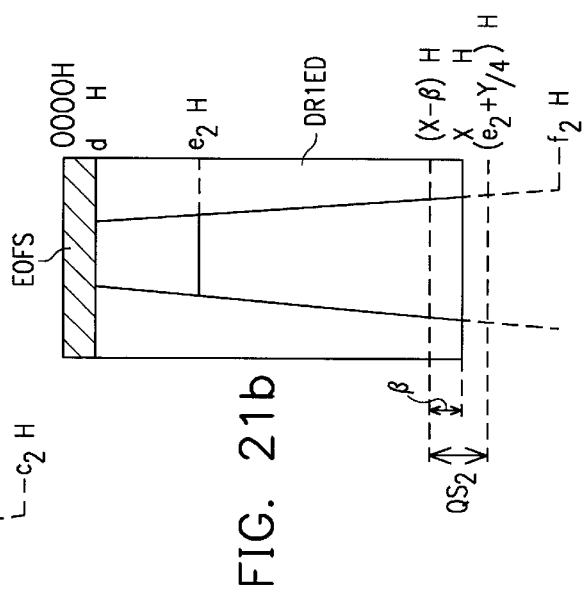

FIG. 20 illustrates the typical relation between reduced images DR1RU and DR1RD stored in the memory units 514 to 517 in relation to the original DR1.

Referring to FIG. 20, offset areas EOFS are caused in a constant value regardless of a magnification M, i.e., reduction or enlargement, whereby values "a" and "d" are identical to those in an equal-scale magnification. Namely, $$a = d = const$$

On the other hand, respective values "b1", "c1", "e1" and "f1" are expressed in the following equations (4) to (7) in correspondence to the magnification M (M<1):

$$b1 = (b-a) \times M + a \tag{4}$$

$$c1 = (c-a) \times M + a \tag{5}$$

$$e1 = (e-d) \times M + d \tag{6}$$

$$f1 = (f-d) \times M + d \tag{7}$$

Hence, the set values CONTU and CONTD for line integration are expressed in the following equations (8) and (9):

$$CONTU = b1 - Y/4 \tag{8}$$

$$CONTD = e1 \tag{9}$$

Description is now made on a case of enlargement processing.

FIG. 21 illustrates typical relations between images DR1EU and DR1ED obtained by enlarging the original DR1 and images DR1EUa and DR1EDa stored in the memory units 514 to 517.

In the case of enlargement, a problem different from the above is caused. The enlarged image DR1EU is so downwardly extended that "b" corresponding to the central position of the image DR1 is forced out from the address areas of the memory units 514 to 517 to disappear. In the enlarged image DR1ED, on the other hand, image data of a required number of picture elements are forced out from the address areas of the memory units 514 to 517. Such phenomenons are caused in the case of a high magnification M.

When such images DR1EU and DR1ED are simply line-integrated with each other, the central and lower portions of the original DR1 disappear from the as-obtained image. In order to prevent this, the image data Dm37 to Dm30 subjected to magnification varying processing may be shift-processed to be written in the memory units 514 to 517 with shifted addresses so that picture elements at the boundary between the images DR1EU and DR1ED are included and required numbers of picture elements of the image data Dm37 to Dm30 are stored.

In the images DR1EU and DR1ED, respective values of "b2", "c2", "e2" and "f2" are expressed in the following equations (10) to (13) in correspondence to the magnification M (M>1):

$$b2 = (b-a) \times M + a \tag{10}$$

$$c2 = (c-a) \times M + a \tag{11}$$

$$e2 = (e-d) \times M + d \tag{12}$$

$$f2 = (f-d) \times M + d \tag{13}$$

The shift processing must be performed in the following case: Assuming that X represents final addresses of the memory units 514 to 517, the central position of the image DR1 is forced out from the address areas of the memory units 514 to 517 when $$b2 > X$$

while address areas for storing image data of required numbers of picture elements in the memory units 514 to 517 are insufficient when $$(X - e2) < Y/4$$

The shift processing is required in the above case. As to the images DR1EU and DR1ED, respective shift quantities QS1 and QS2 are expressed in the following equations (14) and (15):

$$QS1 = b2 - X + \alpha \tag{14}$$

$$QS2 = Y/4 - (X - e2) + \beta \tag{15}$$

where $\alpha$ and $\beta$ represent constants for obtaining marginal areas. The shift quantities QS1 and QS2 are different from each other in general. Due to such shift processing, image data of the central portion (boundary portion) of the image DR1 and the image data of required numbers of picture elements are stored in the memory units 514 to 517, as shown in the images DR1EUa and DR1EDa.

When line integration is performed in this case, the set values CONTU and CONTD are expressed in the following equations (16) and (17):

$$CONTU = b2 - Y/4 - QS1 \tag{16}$$

$$CONTD = e2 - QS2 \tag{17}$$

Consider equations for making the set values CONTU and CONTD correspond to all variable scale magnifications M. The equations (4) and (6) are different from the equations (10) and (12) only in the ranges of the variable scale magnifications M. Hence, all can be expressed in single equations in the same range of the equal-scale magnification (M=1):

$$b - b - a + a$$

$$= 1 \times b - 1 \times a + a$$

$$= (b-a) \times 1 + a$$

$$= (b-a) \times M + a, \text{ where } M=1$$

$$e = e - d + d$$

$$= 1 \times e - 1 \times d + d$$

$$=(e-d)\times 1+d$$

$$=(e-d)\times M+d, \text{ where } M=1$$

When no shift processing is performed, the shift quantities may be regarded as QS1=QS2=0. Hence, the set values CONTU and CONTD are expressed in the following equations (18) and (19) respectively:

$$CONTU=(b-a)\times M+a-Y/4-QS1 \quad (18)$$

$$CONTD=(e-d)\times M+d-QS2 \quad (19)$$

Thus, it is possible to attain an effect similar to that in the case of reading an original by a single image sensor and performing single system image processing, also when the original is read by two image sensors and line integration is performed after magnification varying processing in two systems.

The method of shifting the image data is not restricted to the aforementioned one. The image data can be shifted in various methods such as that of shifting positions of the data stored in the memory units 514 to 517, for example.

Referring again to FIG. 3, the image data are forcibly zeroed in correspondence to blank portions by masking processing when the specified attribute data a2 is "1" in the trimming/masking units 283a and 283b along the data a2. When the data a2 is "0", on the other hand, the image data are directly outputted from the trimming/masking units 283a and 283b (data through).

The image data outputted from the trimming/masking units 283a and 283b are binarized in the simple binarization processing units 284a and 284b and the pseudo half tone processing units 285a and 285b respectively, to be simultaneously inputted in the selectors 287a and 287b as binary image data DOA, DOB, DEA and DEB.

The pseudo half tone processing units 285a and 285b are now described in detail.

Figure 7:
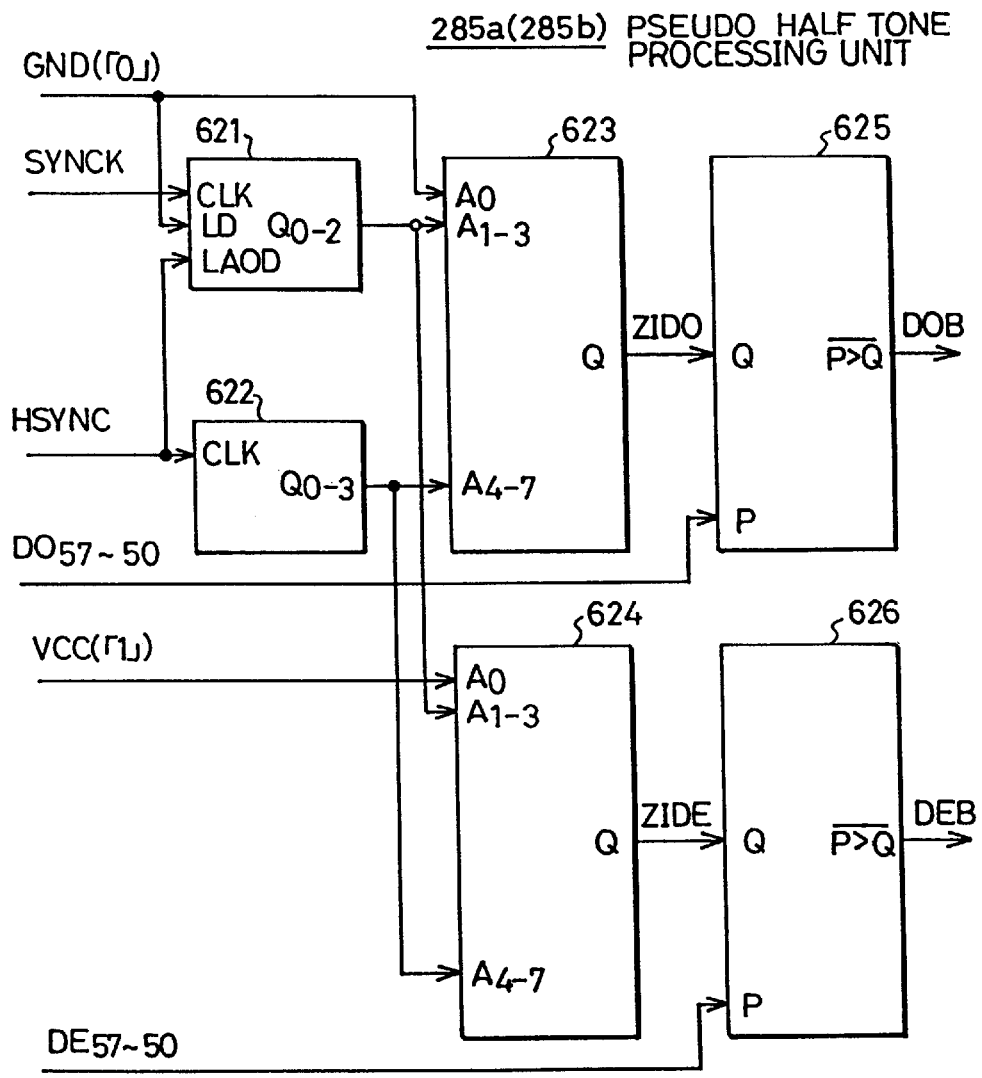
FIG. 7 is a block diagram showing a pseudo half tone processing unit.
Figure 13:
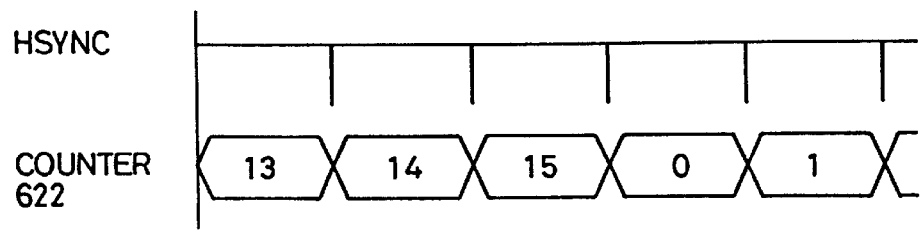
FIG. 13 is a timing chart showing an operating state of a counter of the pseudo half tone processing unit.
Figure 14:
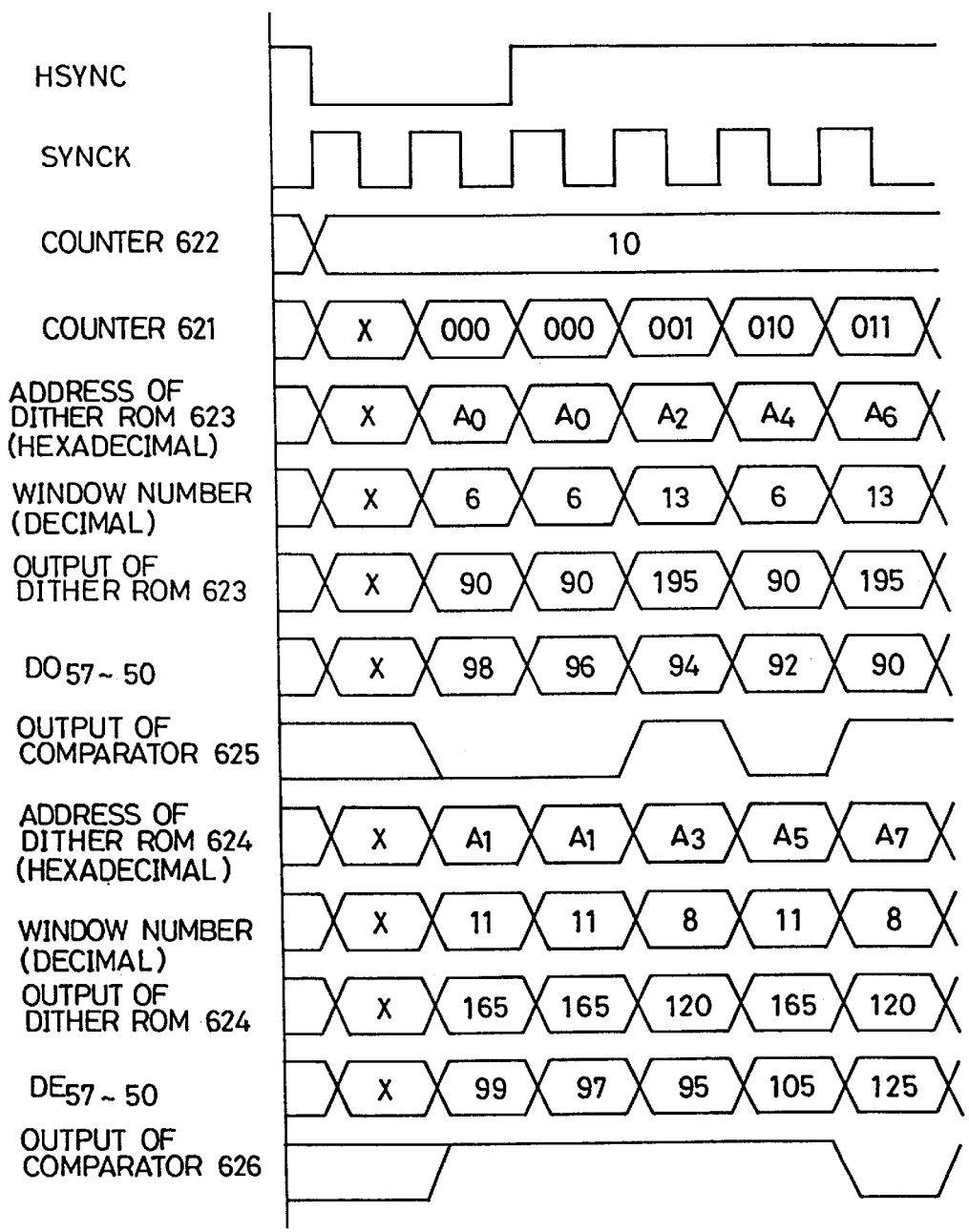
FIG. 14 is a timing chart showing states of signals in respective parts of the pseudo half tone processing unit.
Figure 24:
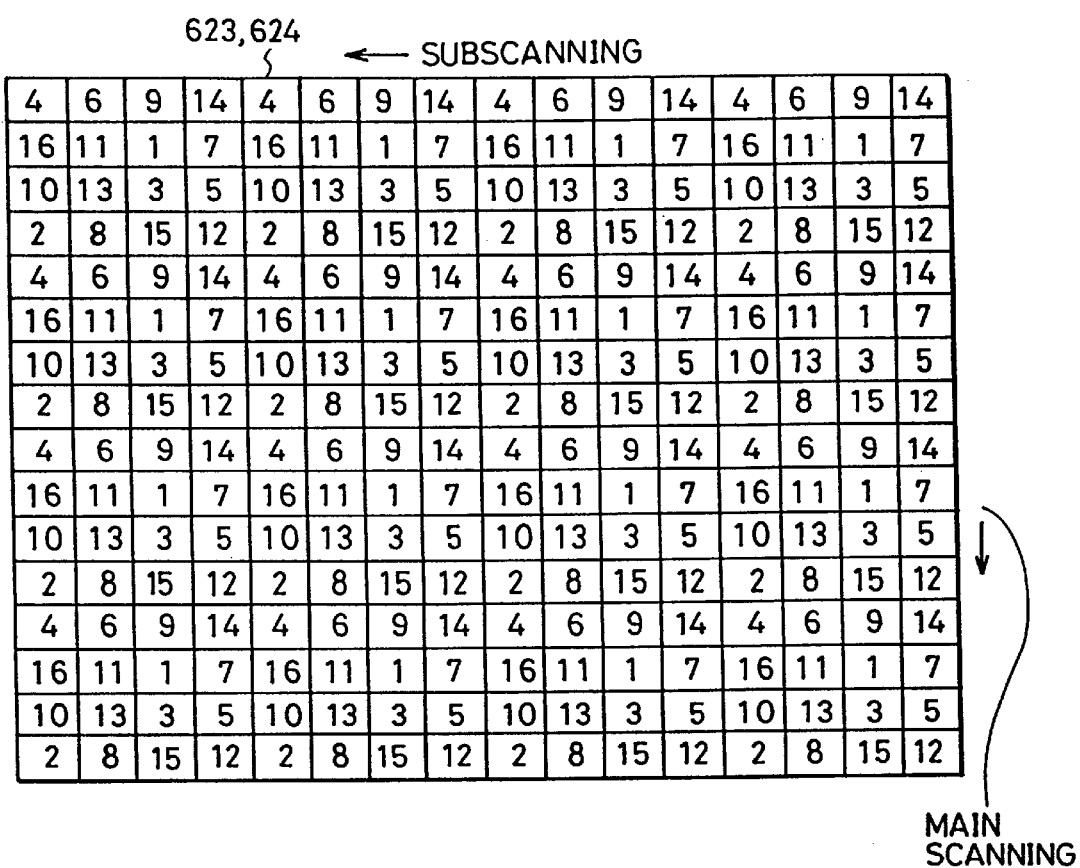
FIG. 24 illustrates storage contents of the dither ROM by window numbers.

FIG. 7 is a block diagram showing the pseudo half tone processing unit 285a or 285b, FIG. 13 is a timing chart showing an operating state of a counter 622 provided in the pseudo half tone processing unit 285a or 285b, FIG. 14 is a timing chart showing states of signals in respective parts of the pseudo half tone processing unit 285a or 285b, FIG. 22 illustrates examples of 16-gradation dither matrices employed for ordinary processing, FIG. 23 illustrates relations between addresses and window numbers of a dither ROM 623 or 624, and FIG. 24 illustrates storage contents of the dither ROM 623 or 624 by window numbers.

Referring to FIG. 22, respective picture elements are allotted with numbers (called "window numbers") successively from a low threshold value as shown at (a), while threshold values of picture elements actually having gradations of eight bits per picture element are shown at (b). These threshold values are stored in the dither ROMs 623 and 624.

Referring to FIG. 7, each of the pseudo half tone processing units 285a and 285b is formed by counters 621 and 622, the dither ROM 623 for odd picture elements, the dither ROM 624 for even picture elements, and comparators 625 and 626.

The counter 621, which is an up counter having a data input terminal LD counting up on a leading edge of a clock, counts the picture element clock signal SYNCK. The data input terminal LD, which is connected to the ground, is set at "0" when the horizontal synchronizing signal HSYNC is received.

The counter 622, which is a counter counting up on a trailing edge of a clock, counts the horizontal synchronizing signal HSYNC.

Namely, these counters 621 and 622 count numbers of the picture elements or lines in the main scanning and subscanning directions respectively.

Low-order three bits of the counter 621 are connected to addresses A1 to A3 of the dither ROMs 623 and 624, while low-order four bits of the counter 622 are connected to addresses A4 to A7 of the dither ROMs 623 and 624. On the other hand, addresses A0 of the dither ROMs 623 and 624 are connected to the ground or VCC (5 V), thereby regularly receiving data "0" or "1".

The comparators 625 and 626 receive outputs of the dither ROMs 623 and 624, image data DO57 to DO50 of odd picture elements and image data DE57 to DE50 of even picture elements, to compare and binarize these values respectively.

With reference to FIGS. 23 and 24, the dither ROMs 623 and 624 are now described in detail.

Each of the dither ROMs 623 and 624 has a memory capacity of 256 bytes. A 16-gradation dither matrix DM may have a memory capacity of 16 bytes at the minimum, since the matrix can be decomposed into four matrices in the main scanning direction and four matrices in the subscanning direction. Thus, each of the dither ROMs 623 and 624 can store 16 dither matrices DM.

In order to implement a dither matrix DM shown in FIG. 24, each of the dither ROMs 623 and 624 may store threshold values in the relation between addresses and window numbers shown at (a) in FIG. 23 so that the counter counting the number of picture elements in the main scanning direction is connected to low-order four bits A0 to A3 of the addresses and that counting the number of picture elements in the subscanning direction is connected to high-order four bits A4 to A7 of the addresses.

In the parallel processing according to this embodiment, window numbers of the odd rows may be compared with the image data DO47 to DO50 of the odd picture elements in the main scanning direction of FIG. 24 and those of the even rows may be compared with the image data DE57 to DE50 of the even picture elements. The dither ROMs 623 and 624 store the threshold values in accordance with the addresses and the window numbers, as a matter of course.

Referring again to FIGS. 7, 13 and 14, the counter 622 is a ring counter which counts the number of lines in the subscanning direction. On the other hand, the counter 621 is a ring counter, counting up by the picture element clock SYNCK, whose count value is zeroed by the horizontal synchronizing signal HSYNC every line for lateral coincidence of the dither windows such that the window number 9 is leftwardly adjacent to the window number 14, the window number 2 is leftwardly adjacent to the window number 8 and the window number 5 is leftwardly adjacent to the window number 10.

The address A0 of the dither ROM 623 for the odd picture elements is fixed at "0" and the address A0 of the dither ROM 624 for the even picture elements is fixed at "1" as hereinabove described, whereby the low-order four bits of the addresses of the dither ROM 623 are changed as 0, 2, 4, 6, 8, A, C, E, 0, 2, . . . (hexadecimal), while those of the addresses of the dither ROM 624 are changed as 1, 3, 5, 7, 9, B, D, F, 1, 3, . . . .

Therefore, the dither ROM 623 outputs the threshold values of the window numbers of the odd rows and the dither ROM 624 outputs the threshold values of the window numbers of the even rows in the main canning direction of FIG. 24 respectively.

Thus, it is possible to readily perform half tone processing also when the image data are divided into odd and even picture elements to be subjected to parallel processing. It is also possible to perform pseudo half tone processing of various gradations such as 65 gradations or 256 gradations by a similar method, as a matter of course.

While the dither ROMs 623 and 624 have the same contents and the addresses supplied to these dither ROMs 623 and 624 are arranged to cope with odd and even picture elements in this embodiment, the same effect can be attained also when the dither ROMS 623 and 624 are dedicated for odd picture elements and even picture elements respectively, for example, and addresses thereto are supplied along well known one-system processing.

Referring again to FIG. 3, the selectors 287a and 287b select either the binary image data DOA or DOB, or the binary image data DEA or DEB in accordance with output data DSEL0 from the data selection unit 286.

The data selection unit 286 receives the specified attribute data a0 for controlling binarization processing with the aforementioned determined attribute data α0 obtained by automatic determination of binarization attributes, so that the value of the output data DSEL0 is set in response to the value of the data a0. When the data a0 is "0", the determined attribute data α0 is outputted as the output data DSEL0, while inverted data of the determined attribute data α0 is outputted when the data a0 is "1".

In other words, the image processing unit 28 defaults external specification of binarization processing to output binary image data based on automatic determination of binarization attributes made by the image determination unit 25 when the data a0 is "0", while the same outputs binary image data subjected to binarization processing reverse to the result of automatic determination of binarization attributes when the data a0 is "1".

The negative processing units 288a and 288b output the binary image data received from the selectors 287a and 287b or inverted data thereof when the specified attribute data a1 is "0" or "1" as binary image data DONP and DENP.

Figure 8:
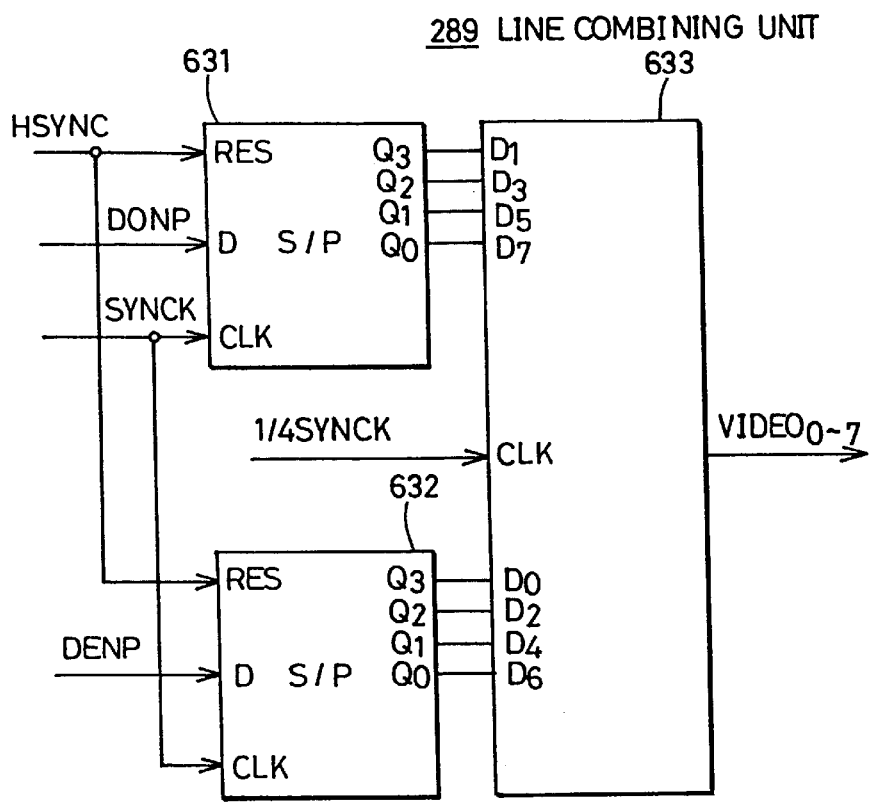
FIG. 8 is a block diagram showing a line combining unit.
Figure 15:
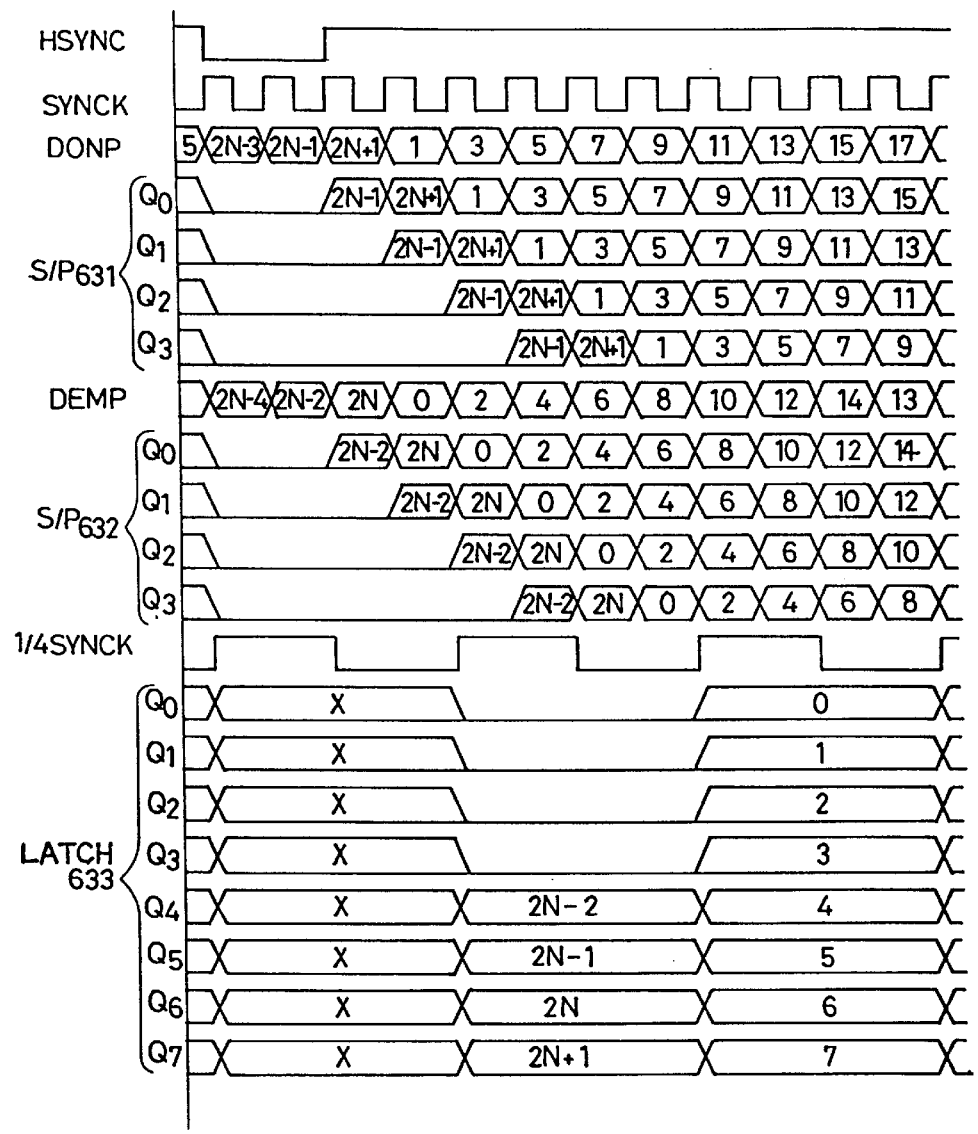
FIG. 15 is a timing chart showing states of signals in respective parts of the line combining unit.

FIG. 8 is a block diagram showing the line combining unit 289, and FIG. 15 is a timing chart showing states of signals in the respective parts of the line combining unit 289.

The line combining unit 289 is formed by serial-in parallel-out shift registers 631 and 632 and a D-latch 633.

The shift registers 631 and 632 shift the as-received binary image data DONP and DENP in synchronization with the picture element clock signal SYNCK and output the same as four bits in parallel.

The latch 633 receives 4-bit data outputted from the shift registers 631 and 632 as odd and even data respectively, and latches the same in synchronization with a clock signal ¼SYNCK having a cycle ¼ that of the picture element clock signal SYNCK. Thus, the binary image data DONP and DENP having been separated into odd and even picture elements are combined and outputted as the 8-bit parallel image data VIDEO0 to VIDEO7.

Referring again to FIG. 2, the attribute data output control unit 31 combines the determined attribute data α0 and α1 and the specified attribute data a2 to a0, to output 5-bit attribute data a4 to a0.

The output control unit 29 selects the image data VIDEO0 to VIDEO7 or the attribute data a4 to a0 in response to output data C0 to C1 from the CPU 20, and outputs the same as output data DATA.

Thus, the image reader 1 performs processing including color separation, quantization, shading correction, density conversion, magnification variation and filtering in a parallel manner on the two-system image signals obtained by reading the original DR in line division by the two image sensors 10a and 10b. The one-line combining/separating unit 282 performs line integration and picture element division, to perform processing including trimming, masking, simple binarization, pseudo half tone processing and negative processing on the two-system image data divided into image data of odd and even picture elements. Finally the line combining unit 289 combines these image data.

Thus, the overall processing speed is improved in the image reader 1 while the processing speed is substantially doubled in the pseudo half tone processing, which has required a considerable time in general, whereby it is possible to read an original image at a high speed also when the original is large-sized.

In order to perform parallel processing by the two system pseudo half tone processing units 285a and 285b, one line is divided not into a front half and a rear half but into an odd picture element block (image data DO57 to DO50) which is a set of image data of odd picture elements and an even picture element block (image data DE57 to DE50) which is a set of image data of even picture elements in each line, whereby image densities, color tones and the like are unified in the overall original image and excellent image quality can be attained.

If each line is divided into front and rear halves to be subjected to pseudo half tone processing in parallel, for example, image densities, color tones and the like may be varied with the front and rear portions, to extremely deteriorate the image quality.

Further, the image data DO57 to DO50 of the odd picture elements and the image data DE57 to DE50 of the even picture elements are subjected to pseudo half tone processing with threshold values stored in the odd and even addresses of the same dither ROMs 623 and 624 in the respective main scanning direction, whereby the pseudo half tone processing can be easily performed in parallel with a simple structure.

In the aforementioned embodiment, each line is divided into two picture element blocks repeated every other picture element in a unit of one picture element such as an odd or even picture element. Alternatively, it is possible to divide each line into an arbitrary number of picture element blocks repeated every arbitrary basic unit of an arbitrary number of picture elements, such as two picture element blocks repeated every basic unit of a plurality of picture elements such as two, three or four picture elements, or four picture element blocks repeated every three picture elements with a basic unit of one picture element such as 1, 2, 3, 4, 1, 2, . . . , for example. That is, image data of each line are divided into N sets (N≧2), wherein the nth set (1≦n≦N) is that of image data of picture elements in an f(n)th (f(n):function) line in a subscanning direction. The function can be expressed algebraically as f(n)=aNx+a(n−1)+1 where a is a constant integer and x≧0. The apparatus includes N sets of image processing circuits for processing the image data in a parallel manner, such that the nth said image processing circuit processes the image data of the nth set.

The operation of the image reader 1 is now described with reference to flow charts shown in FIGS. 25 to 35.

Figure 25:
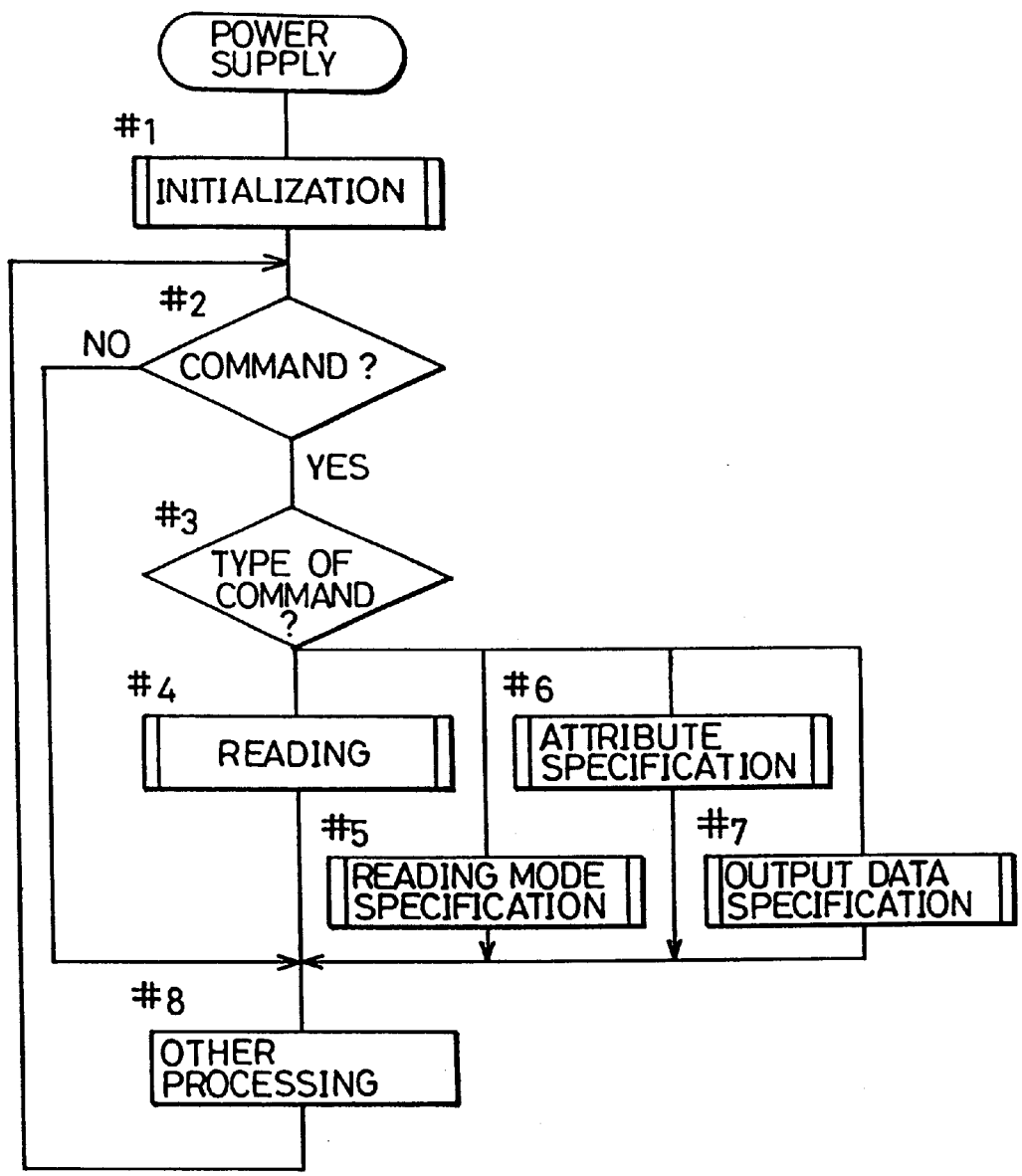
FIG. 25 is a flow chart schematically illustrating an operation of a CPU.

FIG. 25 is a main flow chart schematically showing the operation of the CPU 20.

When power is supplied to start the program, initialization is first made at a step #1.

At a step #2, a determination is made as to whether or not a command is received from the host unit. If the determination is Yes, the type of the command is determined at a step #3, to execute reading, reading mode specification, attribute specification and output data specification at steps

4, #5, #6 and #7 respectively in response to the as-determined type.

Thereafter other processing is executed at a step #8 and the process is returned to the step #2, to repeat the steps #2 to #8.

Figure 26:
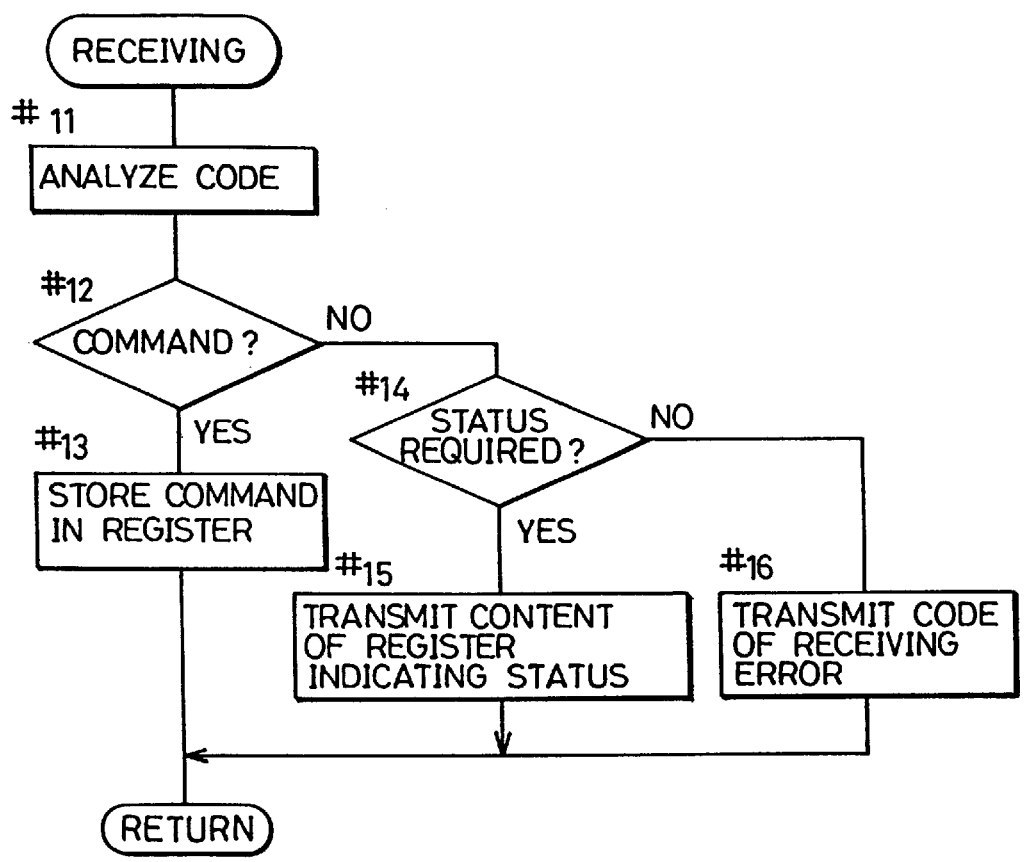
FIG. 26 is a flow chart showing receiving processing.
Figure 27:
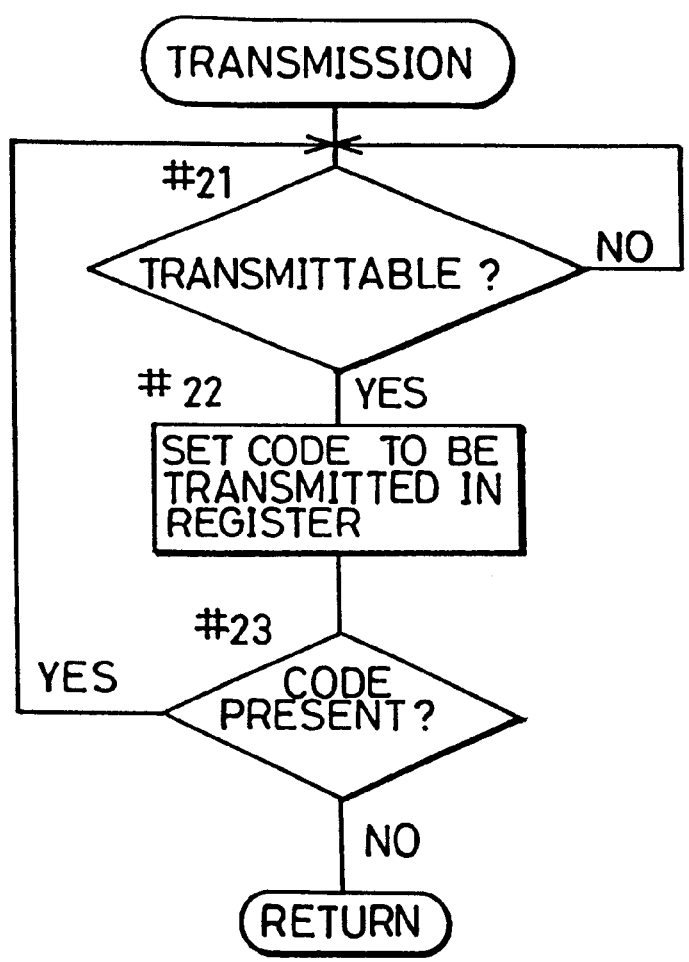
FIG. 27 is a flow chart showing transmission processing.

FIGS. 26 and 27 are flow charts showing receiving processing and transmission processing respectively.

These routines are interruption routines, which are timely executed in response to an access from the host unit.

In the receiving processing shown in FIG. 26, the code of a received signal is first analyzed at a step #11. If receiving of a command is confirmed at a step #12, the as-received command is stored in a prescribed area of the register 20b (FIG. 2) at a step #13.

If the received signal is determined as requiring a notice of a status at a step #14, data indicating the status such as a wait state is read from the register 20b and transmitted to the host unit.

If the received signal corresponds to none of previously defined commands and status requirements, on the other hand, code data indicating a receiving error is transmitted at a step #16.

In the transmission processing shown in FIG. 27, completion of preceding transmission is waited to confirm capability of next transmission at a step #21, and bode data to be transmitted is set in the register 20b at a step #22.

Thereafter a determination is made at a step #23 as to presence/absence of code data to be transmitted, i.e., requirement/non-requirement for transmission, and the process is returned to the step #21 if transmission is required.

Figure 28:
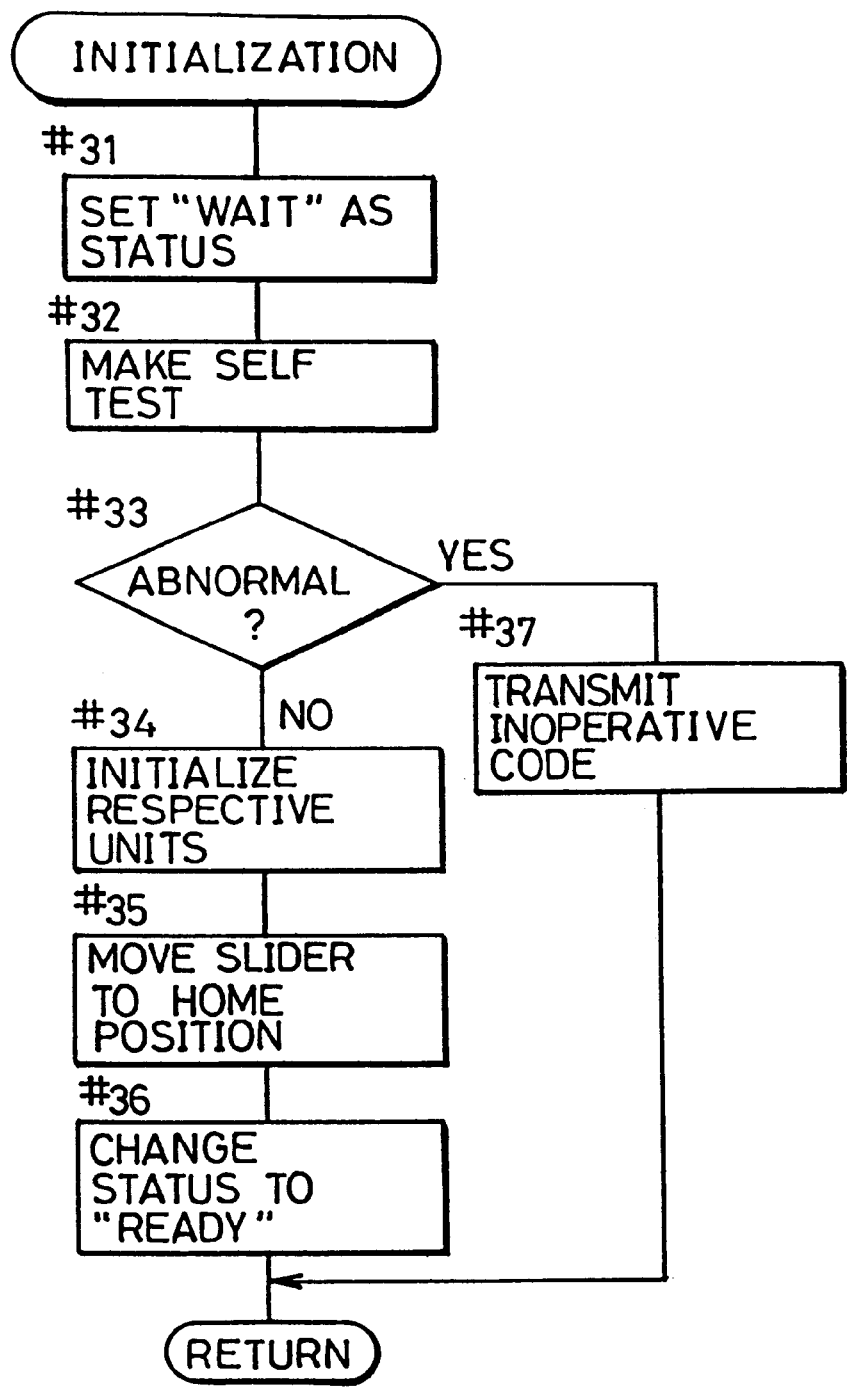
FIG. 28 is a flow chart showing initialization processing.

FIG. 28 is a flow chart showing the initialization processing at the step #1 shown in FIG. 25.

First, "WAIT" indicating an intermediate state of preparation for read scanning is set as a variable showing the status of the apparatus. In other words, data corresponding to "WAIT" is set in a status area of the register 20b at a step #31.

Then, a self test is made at a step #32 to determine whether or not the respective units operate correctly. Presence/absence of abnormality is determined at a step #33, and if any unit is abnormal, the process is advanced to a step #37 to transmit an inoperative code to the host unit.

If no abnormality is confirmed, on the other hand, the process is advanced to a step #34 to initialize the respective units. At this time, data "0" are written in the attribute memory 30 as the specified attribute data a0, a1 and a2. If the specified attribute data a0, a1 and a2 are not rewritten after this step, therefore, the image processing unit 28 performs no image edition such as trimming or negative-positive inversion while binarization processing is performed on the basis of the determined attribute data a0.

Further, the density conversion unit 26 is set to attain a standard density, while the output control unit 29 selects selector inputs to alternately output the image data VIDEO0 to VIDEO7 and the attribute data a4 to a0.

After such initialization, the first slider 13 is moved to a home position at a step #35, and then the status is changed from "WAIT" to "READY" indicating a stand-by state.

Figure 29:
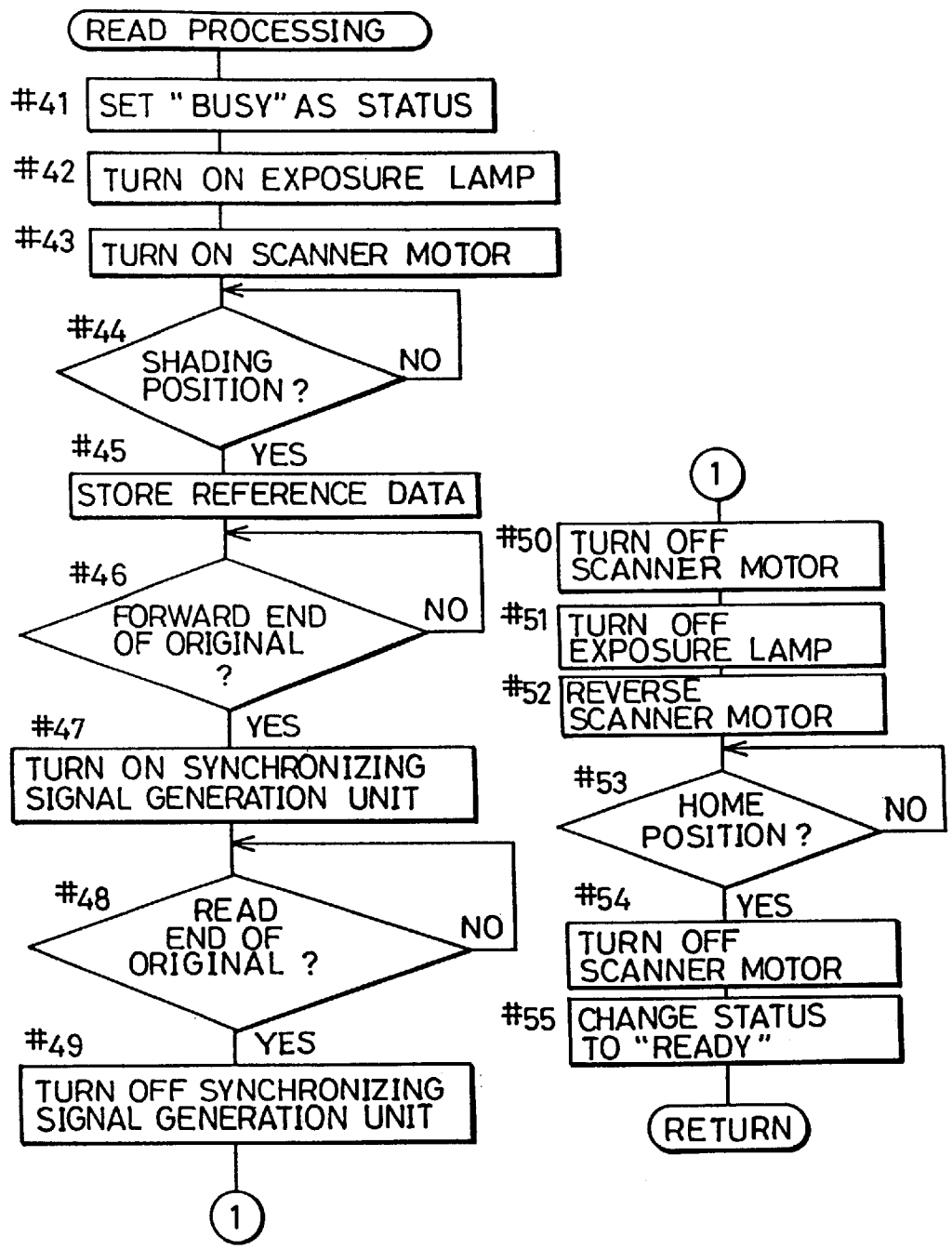
FIG. 29 is a flow chart showing reading processing.

FIG. 29 is a flow chart showing the aforementioned read processing.

First, "BUSY" indicating data reading is set as the status of the apparatus at a step #41, and the exposure lamp 4 is turned on at a step #42.

Then the scanner motor 16 is turned on at a step #43, and there is a wait until the first slider 13 reaches a shading position, i.e., a position immediately under the reference pattern 14 at a step #44.

When the first slider 13 reaches the position under the reference pattern 14, the reference pattern 14 is read for shading correction, and reference image data (white data) are stored in the line memory 24 at a step #45.

Then, there is a wait for the first slider to reach the forward end of the original at a step #46, and the synchronizing signal generation unit 40 is turned on at a step #47 to output the synchronizing signal. Thus, the respective units are driven by the synchronizing signal, to alternately output the effective image data VIDEO0 to VIDEO7 and attribute data a4 to a0 after starting of scanning of a ninth line.

Completion of scanning of the original, i.e., reaching of the first slider 13 to a rear end position of the original is waited at a step #48, the synchronizing signal generation unit 40 is turned off at a step #49, the scanner motor 16 is temporarily turned off at a step #50, and the exposure lamp 4 is turned off at a step #51.

The scanner motor 16 is reversely rotated to return the sliders 13 and 13a at a step #52, return of the first slider 13 to the home position is waited at a step #53, the scanner motor 16 is turned off at a step #54, and finally the status is changed to "READY" at a step #55.

Figure 30:
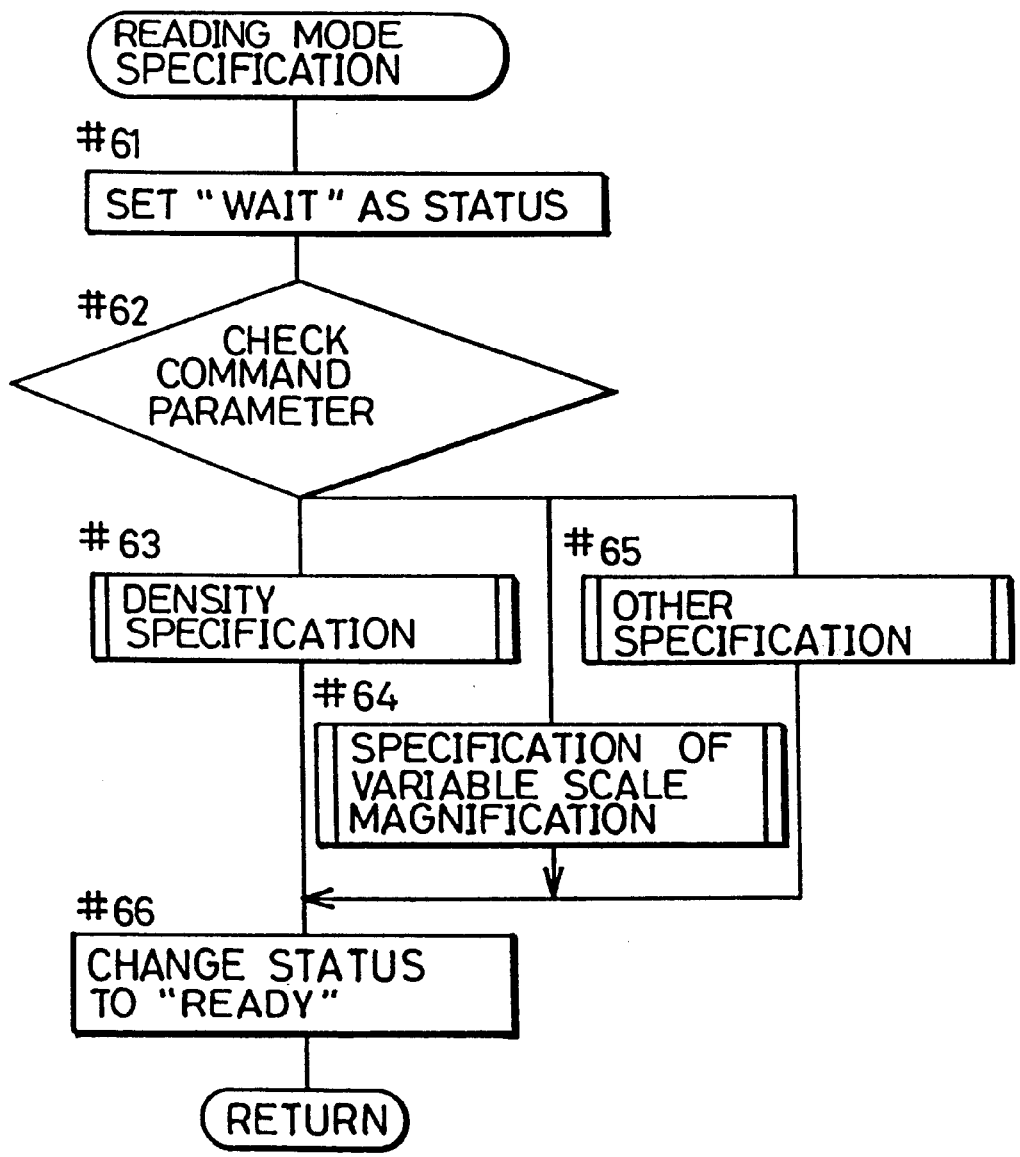
FIG. 30 is a flow chart showing reading mode specifying processing.

FIG. 30 is a flow chart showing the reading mode specifying processing at the step #5 shown in FIG. 25.

The status is set as "WAIT" at a step #61 and a parameter included in the command is determined at a step #62 to perform density specification at a step #63, specification of a variable scale magnification at a step #64 or other specification such as that for a target device or the like at a step #65. Then the status is returned to "READY" at a step #66.

Figure 31:
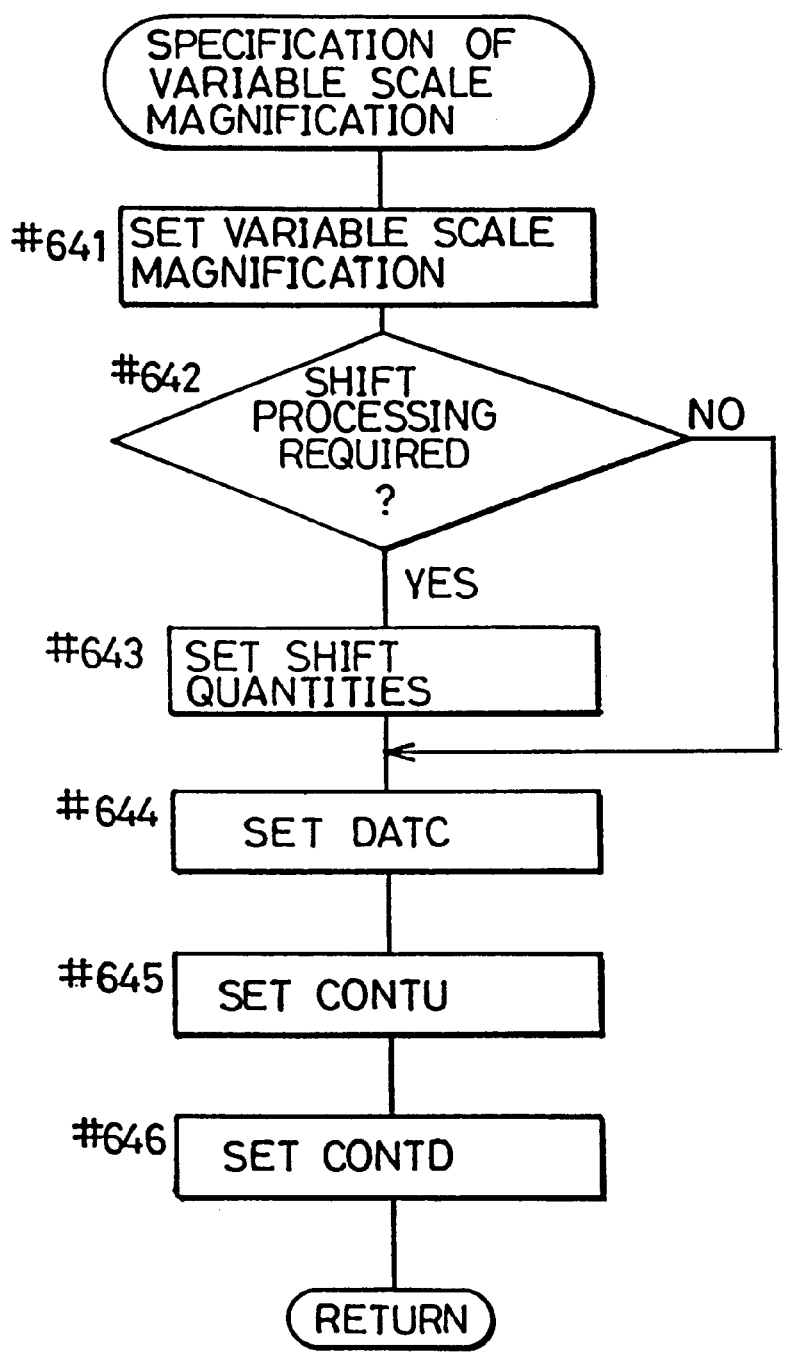
FIG. 31 is a flow chart showing variable scale magnification specifying processing.

FIG. 31 is a flow chart showing the specification of the variable scale magnification at the step #64.

First, the as-specified variable scale magnification M is set in the magnification varying units 280a and 280b at a step #641. Then, a determination is made as to whether or not shift processing is required in the magnification varying units 280a and 280b with reference to the aforementioned conditions at a step #642. If the determination is Yes, the shift quantities QS1 and QS2 are set at a step #643.

Then, the numerical value DATC is set from the CPU 20 in the counter switching unit 614 at a step #644, and the initial values CONTU and CONTD are calculated in accordance with the aforementioned equations on the basis of the specified variable scale magnification M, the set shift quantities QS1 and QS2 and designed values, to be set in the discharge counters U612 and D613 respectively at steps #645 and #646.

Figure 32:
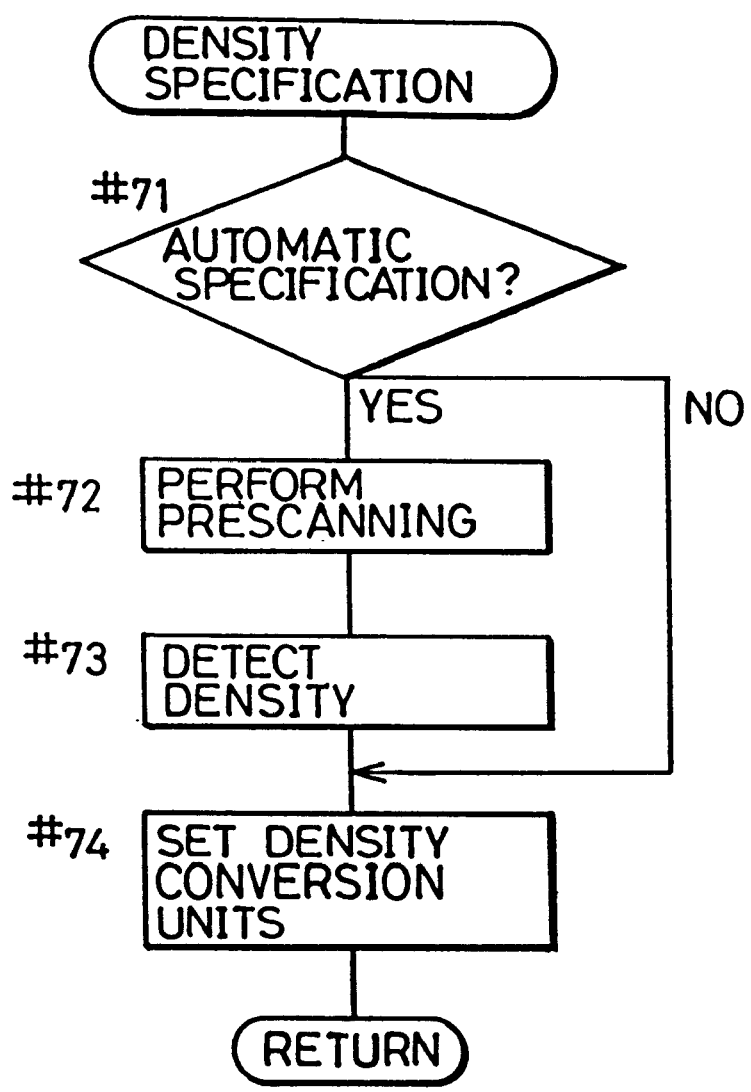
FIG. 32 is a flow chart showing density specifying processing.

FIG. 32 is a flow chart showing the density specifying processing at the step #63.

At a step #71, a determination is made as to whether or not density is automatically specified. If the determination is No, the process is advanced to a step #74 so that the density conversion units 26a and 26b are set in response to parameters received from the host unit on the basis of a specifying operation made by the operator.

If the determination is Yes at the step #71, on the other hand, prescanning is made at a step #72 for detecting the density of the original, and the image data Dm17 to Dm10 successively stored in the line memory 24 are timely incorporated in the RAM 20c. The density of the original is detected at a step #73 on the basis of the data in the RAM 20c, and then the process is advanced to the step #74 to set the density conversion units 26a and 26b in response to the result of detection.

Figure 33:
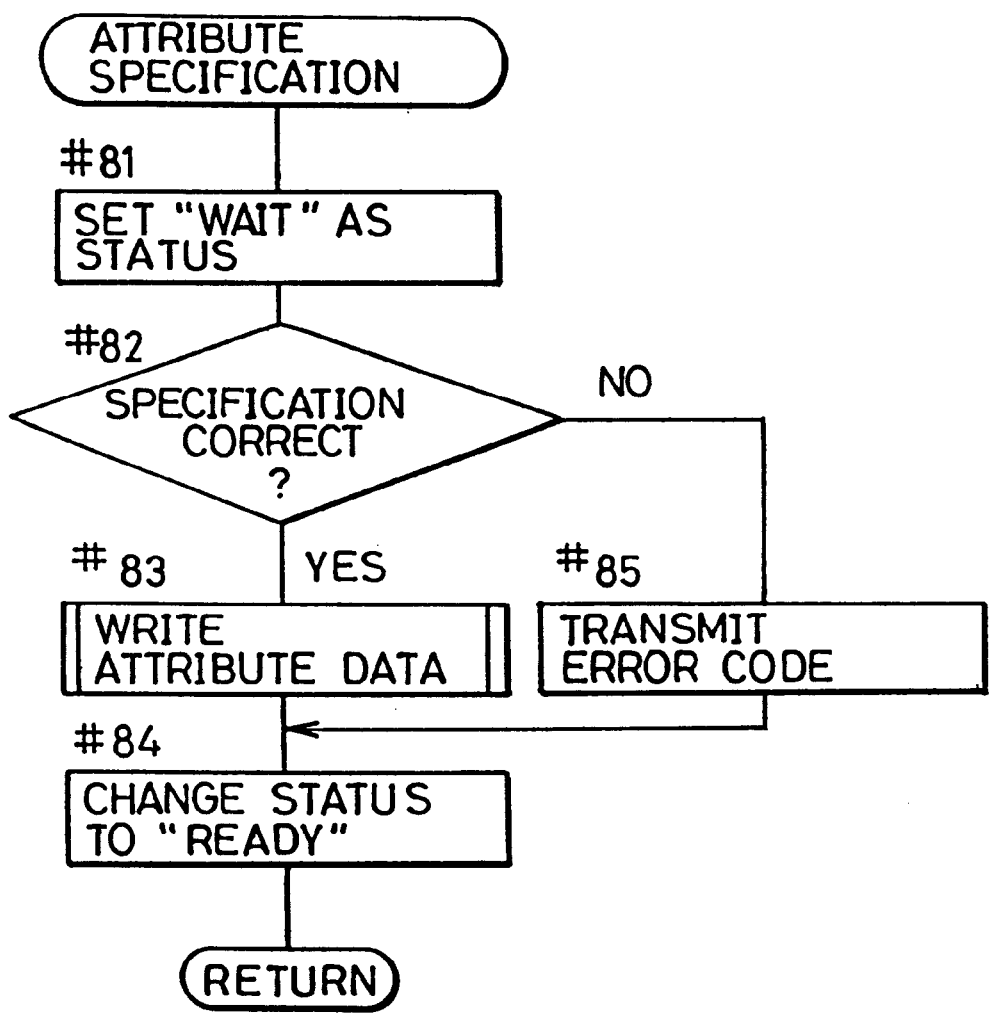
FIG. 33 is a flow chart showing attribute specifying processing.

FIG. 33 is a flow chart showing the attribute specifying processing at the step #6.

First, "WAIT" is set as the status of the apparatus at a step #81, and correctness/incorrectness of specification is determined at a step #82.

If incorrect specification is made such that an area out of the read range is specified or coordinates are specified in erroneous order, for example, the process is advanced to a step #85 to transmit an error code to the host unit.

If the specification is correct, on the other hand, the specified attribute data a0, a1 and a2 are written in the attribute memory 30 at a step #83, and the status is changed to "READY" at a step #84.

Figure 34:
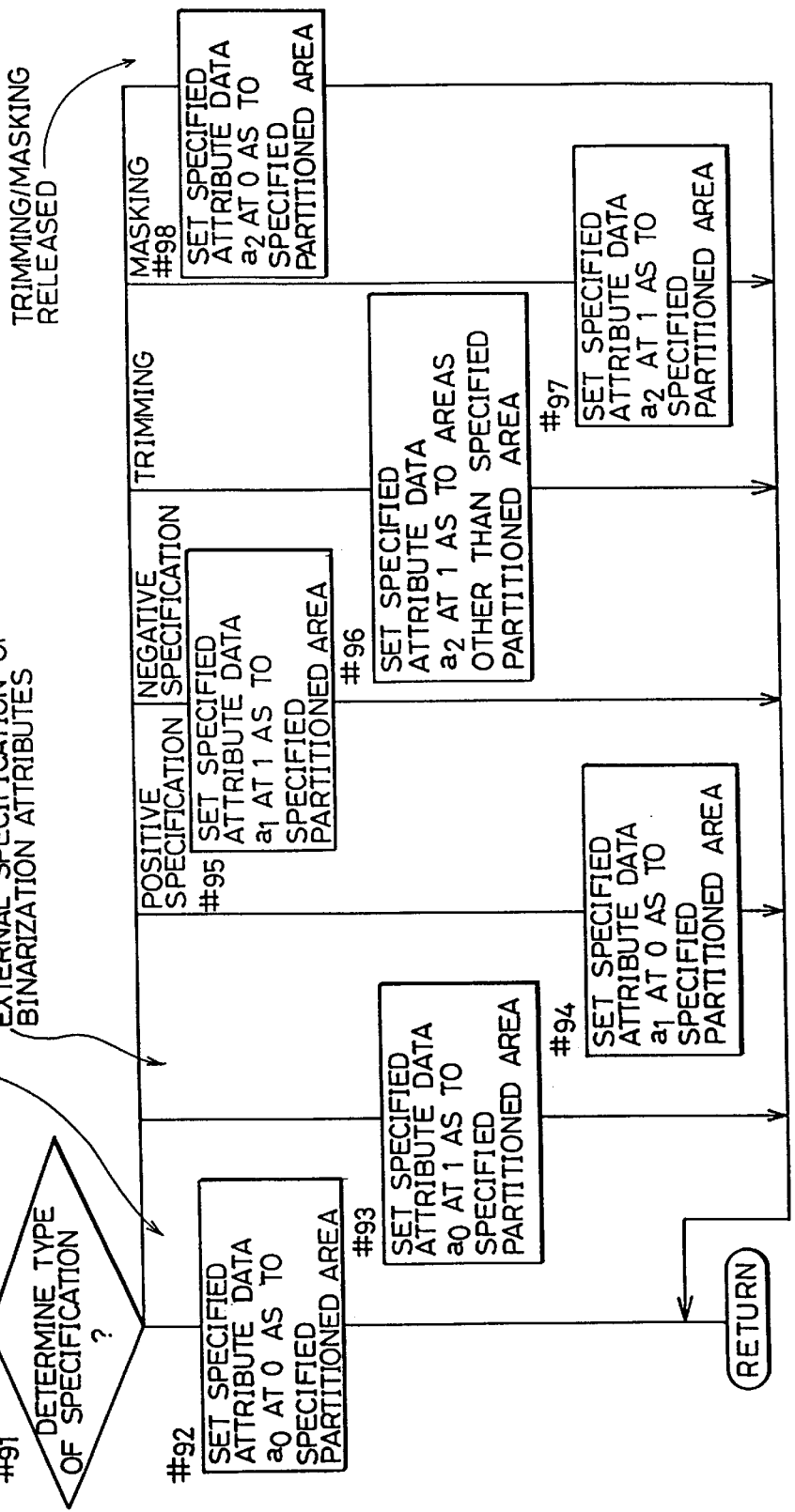
FIG. 34 is a flow chart showing attribute data write processing.

FIG. 34 is a flow chart showing the attribute data write processing at the step #83.

At a step #91, the type of specification from the host unit is determined to execute any of steps #92 to #98 in response to the as-determined type.

When automatic determination of binarization attributes is specified, the specified attribute data a0 is zeroed at the step #92 on the basis of the specified partitioned area E.

When the binarization attributes are previously specified, the specified attribute data a0 is set at "1" as to the specified partitioned area E at the step #93.

In the case of positive specification, i.e., when no performance of black-and-white inversion is specified, the specified attribute data a1 is zeroed at the step #94 as to the specified partitioned area E. In the case of negative specification, i.e., when performance of black-and-white inversion is specified, on the other hand, the specified attribute data a1 is set at "1" at the step #95.

When trimming is specified, the specified attribute data a2 is set at "1" as to areas other than the specified partitioned area E at the step #96. When masking is specified, on the other hand, the specified attribute data a2 is set at "1" as to the specified partitioned area E at the step #97.

When trimming/masking release is specified, the specified attribute data a2 is returned to zero as to areas other than the specified partitioned area E at the step #98.

Figure 35:
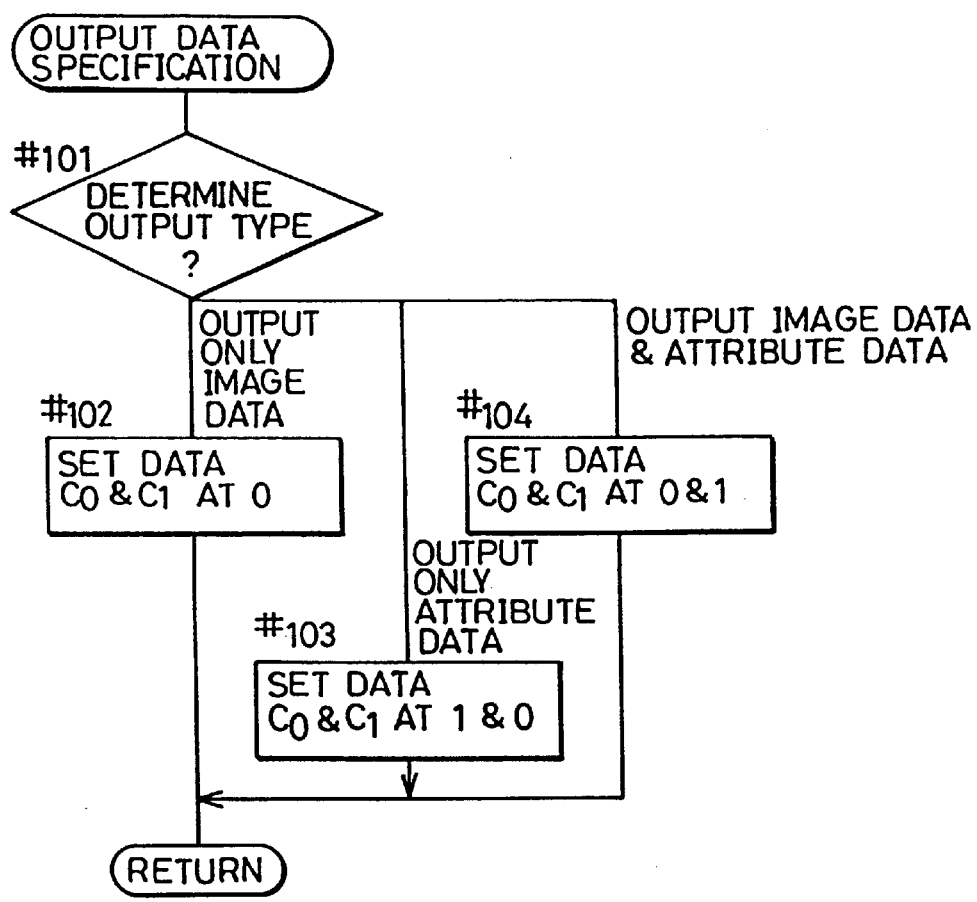
FIG. 35 is a flow chart showing output data specifying processing.

FIG. 35 is a flow chart showing the output data specifying processing at the step #7.

In this routine, the type of the output data DATA is first determined at a step #101, to perform any of steps #102 to #104 in response to the as-determined type.

If output of only the image data VIDEO0 to VIDEO7 is selected, the output control data C0 and C1 are set at "0" at the step #102.

If output of only the attribute data a4 to a0 is selected, the step #103 is carried out to set the output control data C0 and C1 at "1" and "0" respectively.

When output of both the image data VIDEO0 to VIDEO7 and attribute data a4 to a0 is selected, the step #104 is carried out to set the output control data C0 and C1 at "0" and "1" respectively.

In the aforementioned embodiment, the content of the image processing before or behind the one-line synthesizing/separating unit 282 can be modified in various ways. Further, structures, timing etc. of the respective units of the image reader 1 can be also modified in various manners.

(2) Second Embodiment

An image reader 1 according to a second embodiment of the present invention is identical in schematic structure to that shown in FIG. 1, and hence redundant description is omitted.

Figure 36:
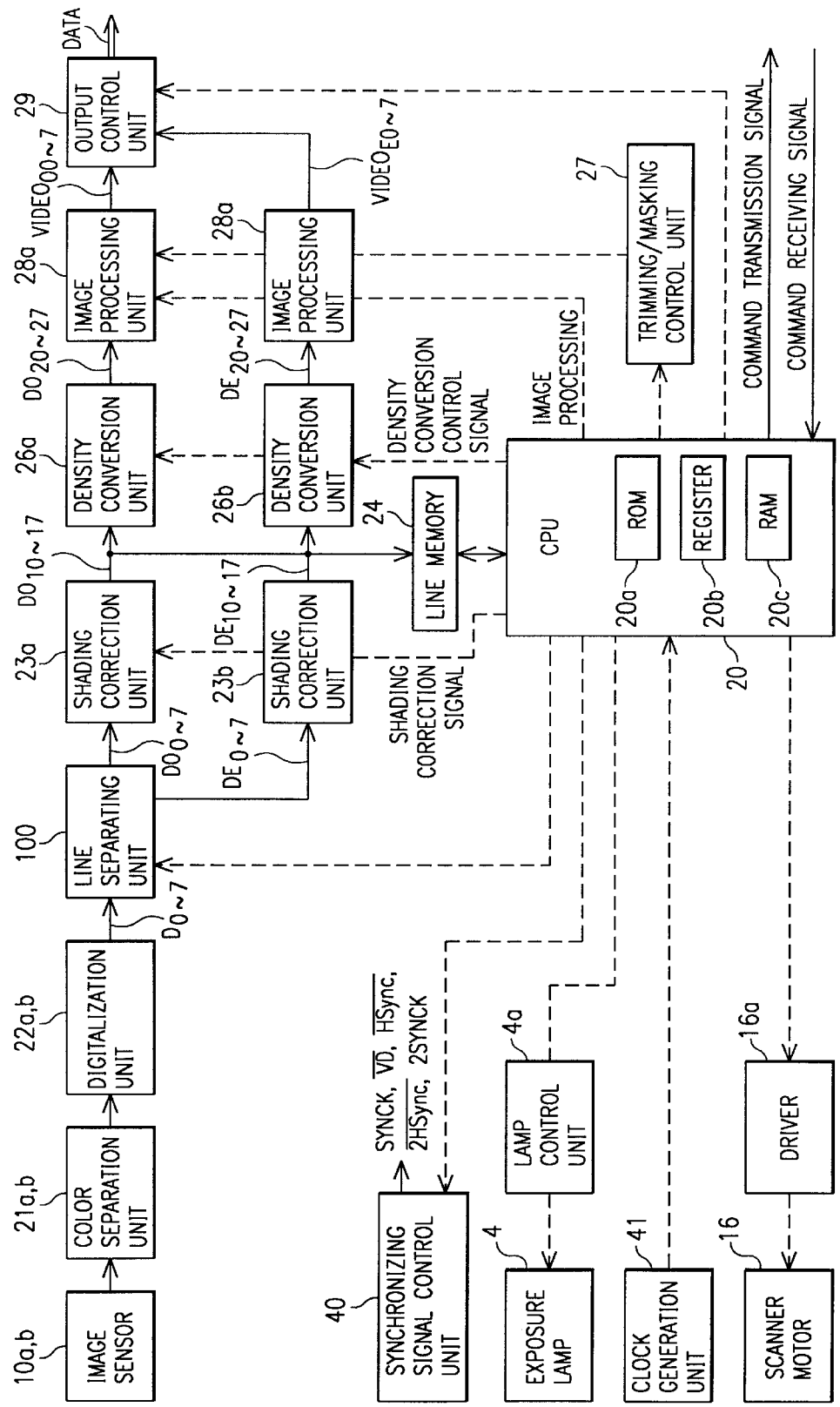
FIG. 36 is a block diagram showing an electric circuit unit in a second embodiment of the present invention.

FIG. 36 is a block diagram showing an electric circuit unit 12 in the second embodiment.

According to the second embodiment, the electric circuit unit 12 is formed by color separation units 21a and 21b for amplifying photoelectric conversion signals received from image sensors 10a and 10b to prescribed voltages, digitalization units 22a and 22b for A-D converting (quantizing) the amplified analog signals and outputting 8-bit image data D0 to D7, a line separating unit 100 for separating the digitalized image data into odd and even lines in a subscanning direction, shading correction units 23a and 23b for correcting light intensity irregularities of image data DO0 to DO7 and DE0 to DE7 being separated into the odd and even lines in a main scanning direction and bit dispersion of the image sensors 10a and 10b, density conversion units 26a and 26b for performing density level adjustment and gamma conversion in response to density characteristics (gamma characteristics) of an externally connected device, image processing units 28a and 28b for performing image processing including image edition and binarization, an output control unit 29 for controlling data output, a trimming/masking unit 27 for specifying a trimming/masking area and performing trimming/masking processing in the image processing units 28a and 28b, a clock generation unit 41, a line memory 24 for storing image data DO10 to DO17 and DE10 to DE17 outputted from the two shading correction units 23a and 23b for one line, a synchronizing signal generation unit 40 for outputting various types of synchronizing signals to the respective units, a lamp control unit 4a for turning on/off an exposure lamp 4, a driver 16a for driving a scanner motor 16 for scanning, and a CPU 20 for controlling overall these units.

The CPU 20 contains a ROM 20a storing processing programs, and a register 20b and a RAM 20c for temporarily storing various flags and statuses in execution of the programs. The CPU 20 communicates with an external host unit comprising an operation panel which is controlled by an operator for transferring data indicating various commands (control command code data) and operating states (statuses) of the image reader 1, and generates data defining image edition such as trimming and masking on the basis of received commands in advance of reading of an original, to set data in the trimming/masking control unit 27.

The synchronizing signals outputted from the synchronizing signal generation unit 40 mainly include a horizontal synchronizing signal $\overline{\text{Hsync}}$ which is outputted every main scanning line, a picture element clock SYNCK serving as the reference for data transmission timing every picture element, an enable signal $\overline{\text{VD}}$ indicating a data output valid period of the image reader 1, and the like.

Figure 37:
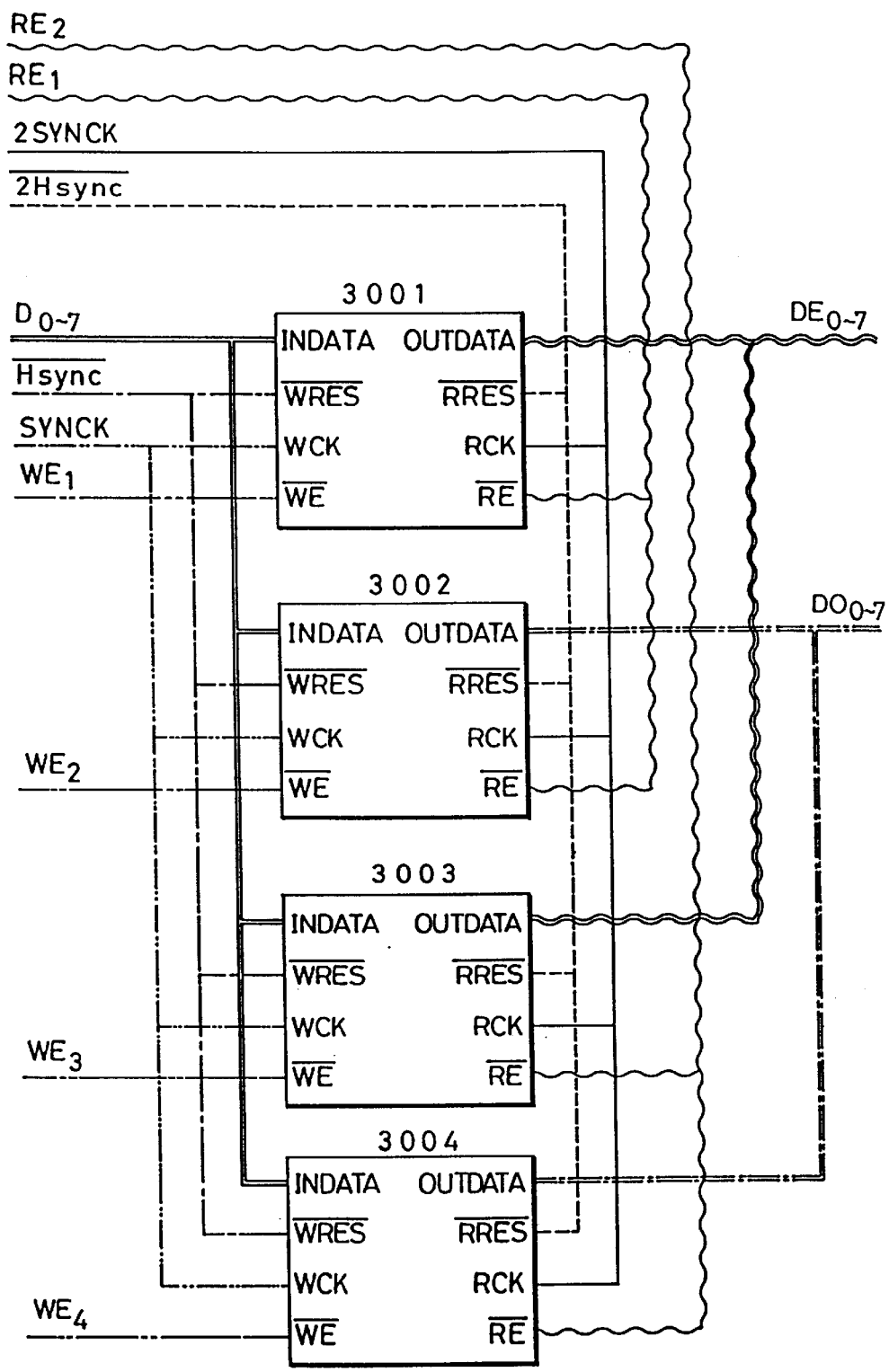
FIG. 37 is a block diagram showing a line separating unit in the second embodiment.

The line separating unit 100 is now described in detail. FIG. 37 is a block diagram showing the line separating unit 100. This line separating unit 100 is formed by four FIFO (First-In First-Out) memories 3001, 3002, 3003 and 3004, each of which can store data for one line (about 5000 bytes).

Figure 38A:
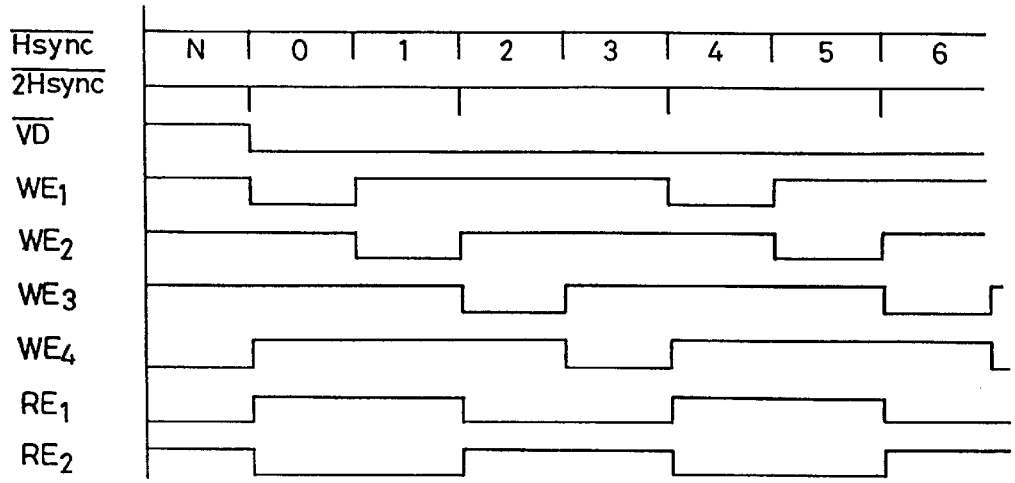
FIGS. 38a and 38b are timing charts showing control signals inputted in FIFO memories.
Figure 38B:
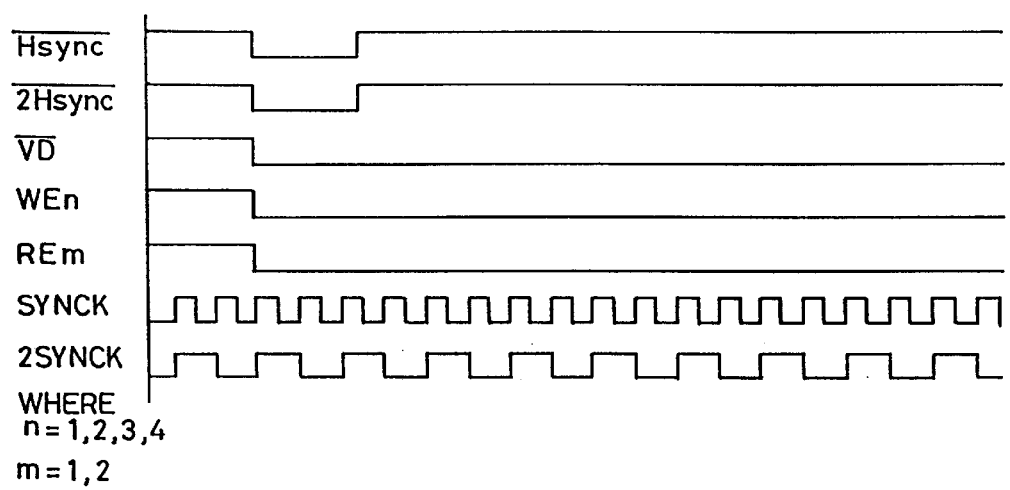

Input terminals INDATA of the FIFO memories 3001, 3002, 3003 and 3004 receive image data quantized in the digitalization units 22a and 22b. Synchronizing clock input terminals WCK, which are adapted to make write addresses of the FIFO memories 3001, 3002, 3003 and 3004 count up and write image data in the memories, receive the signal SYNCK, while $\overline{\text{WRES}}$ terminals for resetting (zeroing) write addresses to the memories receive the signal $\overline{\text{Hsync}}$. Further, $\overline{\text{WE}}$ terminals for allowing write operations in the FIFO memories 3001, 3002, 3003 and 3004 receive signals WE1, WE2, WE3 and WE4 respectively. OUTDATA terminals, which discharge data stored in the FIFO memories 3001, 3002, 3003 and 3004, output the image data DE0 to DE7 as to the FIFO memories 3001 and 3003 and the image data DO0 to DO7 as to the FIFO memories 3002 and 3003, so that these data are transmitted to the shading correction units 23a and 23b respectively. Synchronizing clock input terminals RCK, which are adapted to make read addresses of the FIFO memories 3001, 3002, 3003 and 3004 count up and read data from the memories, receive a signal 2SYNCK having a cycle twice that of the signal SYNCK, while $\overline{\text{PRES}}$ terminals for resetting the read addresses receive a signal $\overline{\text{2Hsync}}$ having a cycle twice that of the signal $\overline{\text{Hsync}}$. Further, $\overline{\text{RE}}$ terminals, which discharge the data stored in the FIFO memories 3001, 3002, 3003 and 3004 and bring the outputs into high impedance states unless allowed, receive signals RE1 and RE2 as to the FIFO memories 3001 and 3002 and as to the FIFO memories 3003 and 3004 respectively. FIGS. 38a and 38b are timing charts showing respective control signals inputted in the FIFO memories 3001, 3002, 3003 and 3004. FIG. 38c is a table showing state changes of the FIFO memories 3001, 3002, 3003 and 3004 every signal $\overline{\text{Hsync}}$.

As understood from FIG. 38c, the FIFO memories 3001 and 3003 regularly output data of even lines, and the FIFO memories 3002 and 3004 regularly output data of odd lines.

Figure 39:
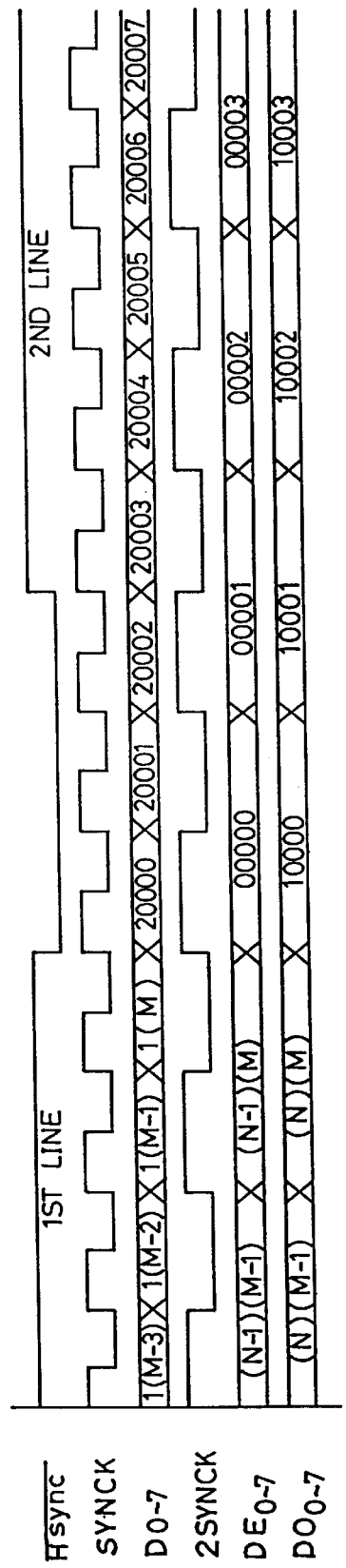
FIG. 39 is a timing chart showing relations between image signals.

FIG. 39 is a timing chart showing relations between the image data D0 to D7, DO0 to DO7 and DE0 to DE7 being switched line to a first line.

It is assumed that X data must be processed while the signal $\overline{\text{Hsync}}$ is at a low level until the image data D0 to D7 are processed and separated into even and odd lines. While the signal $\overline{\text{2Hsync}}$ is at a low level, 2X data must be processed. As to the image data DE0 to DE7 and DO0 to DO7, on the other hand, only X data can be processed per system while the signal $\overline{\text{2Hsync}}$ is at a low level. As to the image data DO0 to DO7 and DE0 to DE7, however, 2X data can be processed per $\overline{\text{2Hsync}}$ since the processing is performed in parallel.

The image data separated into even and odd lines in the line separating unit 100 are shading-corrected in the shading correction units 23a and 23b, density-converted in the density conversion units 26a and 26b, subjected to magnification varying processing in the image processing units 28a and 28b, and processed in filtering units and binarization/pseudo gradation processing units. Thus, image processing is performed in parallel up to the output control unit 29. In advance of the binarization processing, the signal 2SYNCK is employed as a picture element synchronizing signal, as a matter of course.

Figure 40:
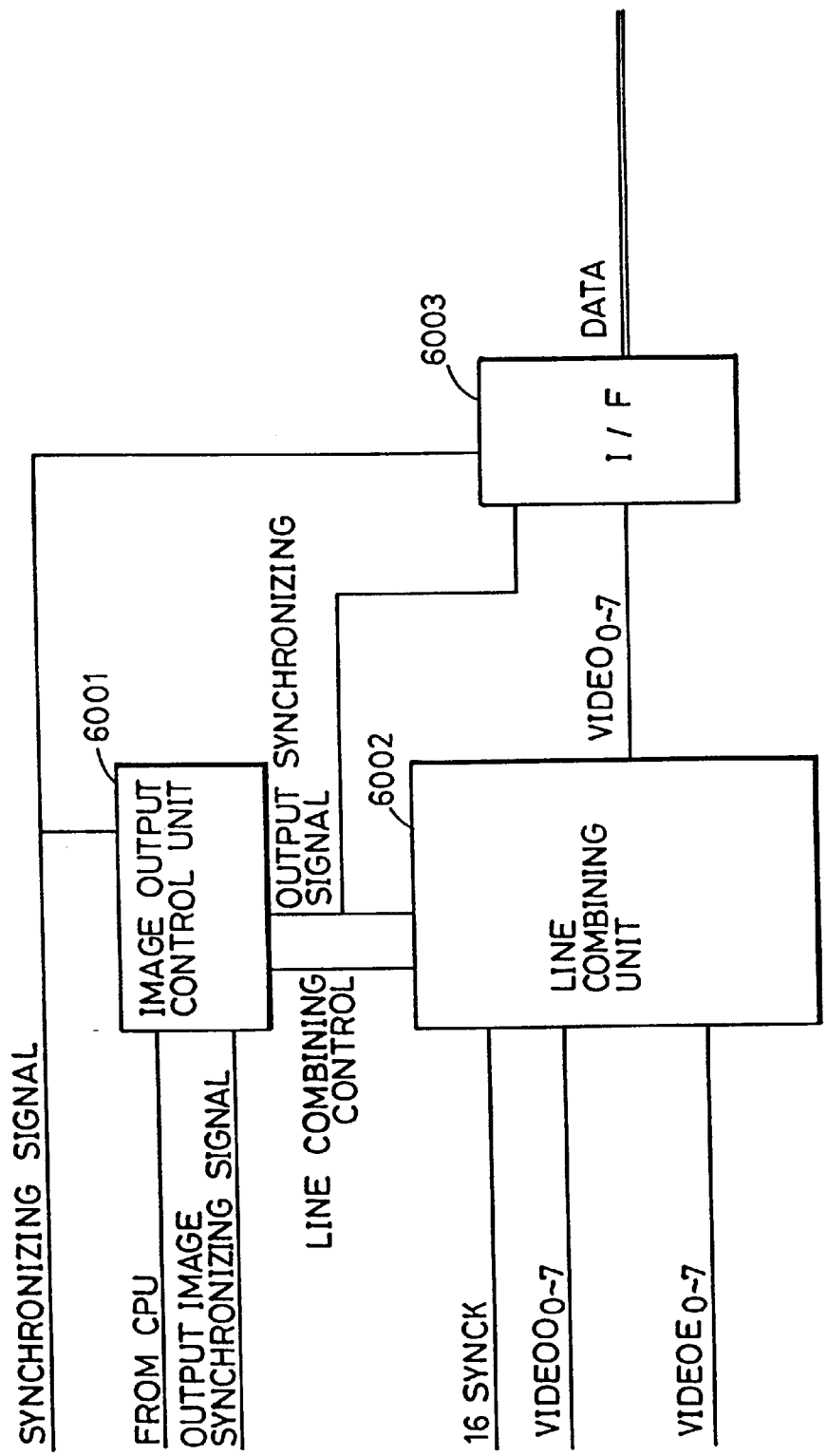
FIG. 40 is a block diagram showing an output control unit.

FIG. 40 is a block diagram showing the output control unit 29.

The output control unit 29 is formed by an image output control unit 6001, a line combining unit 6002, and an I/F unit 6003. The image output control unit 6001 outputs transmission clocks for data to be transmitted to the external host unit to the line combining unit 6002 for generating image data by a number suitable for a read paper size and the I/F unit 6003, on the basis of a command from the CPU 20. The image output control unit 6001 further controls read/write timing of a memory for temporarily storing data in line combining in the line combining unit 6002. The I/F unit 6003 transmits the image signals, the signal $\overline{\text{Hsync}}$, the transmission clock, the signal $\overline{\text{VD}}$ and the like to the external host unit.

Figure 41:
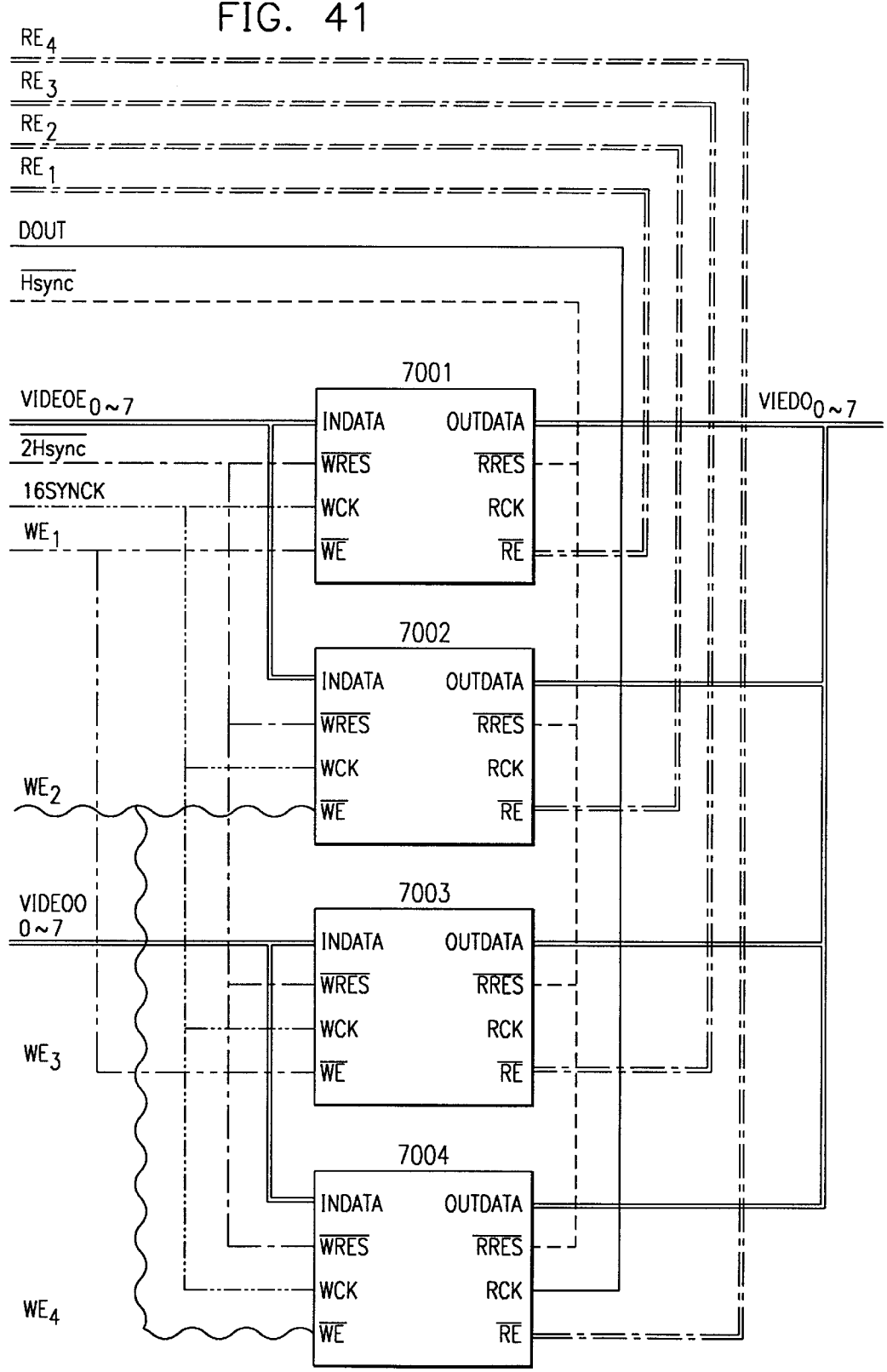
FIG. 41 is a block diagram showing a line combining unit.

The line combining unit 6002 is now described. FIG. 41 is a block diagram showing the line combining unit 6002. This line combining unit 6002 is formed by four FIFO memories 7001, 7002, 7003 and 7004, each of which can store image data for one line.

Figure 42A:
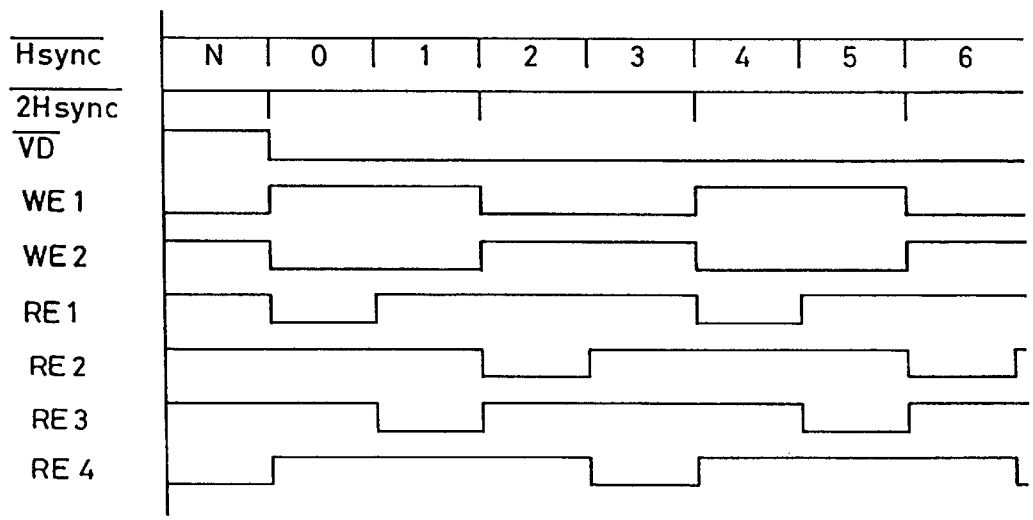
FIGS. 42a and 42b are timing charts showing synchronizing clocks inputted in the FIFO memories.
Figure 42B:
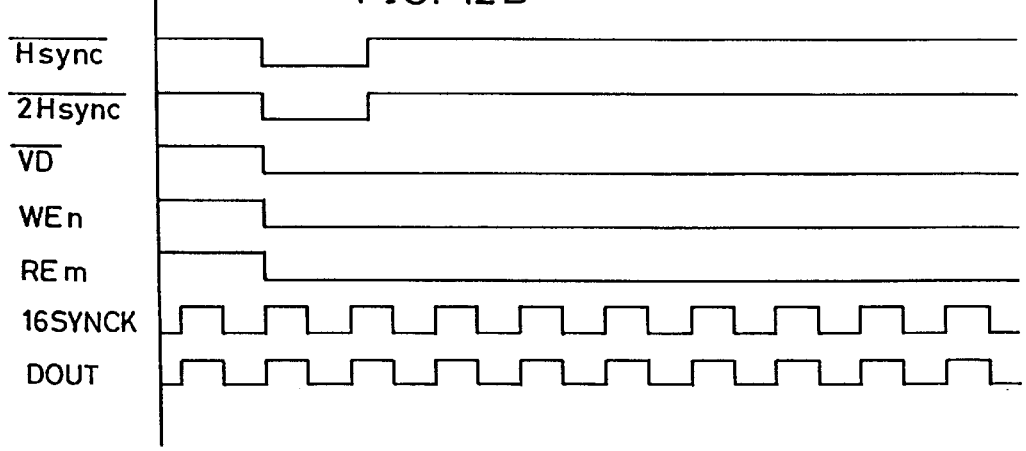

Input terminals INDATA of the FIFO memories 7001, 7002, 7003 and 7004 receive parallel-processed and binarized data VIDEOE0 to VIDEOE7 and VIDEOO0 to VIDEOO7. In more concrete terms, the FIFO memories 7001 and 7002 receive the data VIDEOE0 to VIDEOE7, while the FIFO memories 7003 and 7004 receive the data VIDEOO0 to VIDEOO7 respectively. Synchronizing clock input terminals WCK, which are adapted to make write addresses of the FIFO memories 7001, 7002, 7003 and 7004 count up and write the image data in the memories, receive a signal 16SYNCK having a cycle 16 times that of the synchronizing clock signal SYNCK (twice that of SYNCK due to the parallel processing, 8 times due to the binarization and transmission of one bit for one picture element in units of 8 bits, and hence 2×8=16 times) for attaining synchronization with the image data already binarized in the image processing units 28a and 28b, while $\overline{\text{WRES}}$ terminals for resetting (zeroing) write addresses to the memories receive the signal $\overline{\text{2Hsync}}$ due to the parallel processing. As to $\overline{\text{WE}}$ terminals for allowing write operations in the FIFO memories 7001, 7002, 7003 and 7004, the FIFO memories 7001 and 7003 receive a signal WE1 and the FIFO memories 7002 and 7004 receive a signal WE2 respectively. OUTDATA terminals for outputting data stored in the FIFO memories 7001, 7002, 7003 and 7004 are connected to the I/F unit 6003, for outputting the signals VIDEO0 to VIDEO7. Synchronizing clock input terminals RCK, which are adapted to make read addresses of the FIFO memories 7001, 7002, 7003 and 7004 count up and read the data from the memories, receive a signal DOUT which is generated in a number suitable for the paper size read in the image output control unit 6003 in synchronization with the external host unit, while $\overline{\text{PRES}}$ terminals for resetting the read addresses receive the signal $\overline{\text{Hsync}}$. Further, $\overline{\text{RE}}$ terminals for outputting the data stored in the FIFO memories 7001, 7002, 7003 and 7004 and bringing the outputs into high impedance states unless allowed receive signals RE1, RE2, RE3 and RE4 respectively. FIGS. 42a and 42b are timing charts of various synchronizing clocks inputted in the FIFO memories 7001, 7002, 7003 and 7004. FIG. 42c is a table showing state changes of the FIFO memories 7001, 7002, 7003 and 7004 every $\overline{\text{Hsync}}$.

As understood from FIG. 42c, the image data separated into the even and odd lines and processed in parallel are returned to the original order in the line combining unit 6002 and outputted to the I/F unit 6003.

FIG. 43a is a timing chart showing relations between the data VIDEOE0 to VIDEOE7 and VIDEOO0 to VIDEOO7 in the state 2 of the signal $\overline{\text{Hsync}}$ shown in FIG. 42c, and FIG. 43b is a timing chart showing those in the state 4.

FIG. 44 illustrates the operating concept of the image processing apparatus according to the second embodiment of the present invention.

Although line separation is performed after digitalization in the digitalization units 22a and 22b in the second embodiment, such line separation may be performed in any portion after the digitalization, if the processing speed is sufficient. Referring to FIG. 44, an image processing system including the image sensors 10a and 10b, the digitalization units 22a and 22b and the like according to the second embodiment can be separated into a reading/image preprocessing system 10001, a line separating unit 10002, parallel image processing units 10003a and 10003b including two binarization (including pseudo gradation) processing units, a line combining unit 10004, and an image postprocessing unit 10005. Consider cycles of the synchronizing signal SYNCK for image processing and the synchronizing signal $\overline{\text{Hsync}}$ for one line. In the reading/image preprocessing system 10001, the synchronizing signal SYNCK for one picture element and the synchronizing signal $\overline{\text{Hsync}}$ for one line are synchronized for image-processing every picture element of an image 10000a read by the image sensors 10a and 10b. Assuming that t1 and t2 represent cycles of the signals SYNCK and $\overline{\text{Hsync}}$ respectively, the following relational expression is obtained:

$$t2 = t1 \times K \quad (20)$$

where K represents the number of image data to be image-processed in the main scanning direction.

After the image data are separated into odd and even lines in the line separating unit 10002, two lines are simultaneously image-processed such that lines 0 and 1, lines 2 and 3, and lines 4 and 5 are simultaneously image-processed in 10000b and 10000c, for example. Thus, the cycle of the signal $\overline{\text{Hsync}}$ for image-processing one line, which is twice that in advance of the line separating unit 10002, is 2t2 (t2'=2t2 . . . (21)). The number K of data to be processed, which are included in one line, remains unchanged, and hence the cycle of the synchronizing signal SYNCK for one picture element is expressed as follows:

$$t1' = t2' \div K = 2t1 \quad (22)$$

Hence, the synchronizing signals each having cycle twice that before line separation, i.e., a ½ frequency, may be employed as the synchronizing signals for performing image processing after line separation.

When binarization (including pseudo gradation) processing is performed in the parallel image processing units 10003a and 10003b to simultaneously process eight bits of image data in place of one bit for one picture element, the image processing may be performed with synchronizing signals each having a cycle of eight times, i.e., 8×2=16 times, i.e., a 1/16 frequency. When line combining is thereafter performed, it is necessary to process odd and even lines in a time-series manner. Therefore, a time to process image data of one line is identical to that before line separation, i.e., t2. As to the synchronizing signals after the line combining, therefore, a time required for image-processing binarized picture elements in units of eight bits is considered as follows:

$$t1'' = t2/K \times 8 = 8t1 \quad (23)$$

When line combining is performed after binarization, the cycle of the synchronizing signals in units of eight picture elements may be eight times that before line combining, i.e., a ⅛ frequency.

Figure 45:
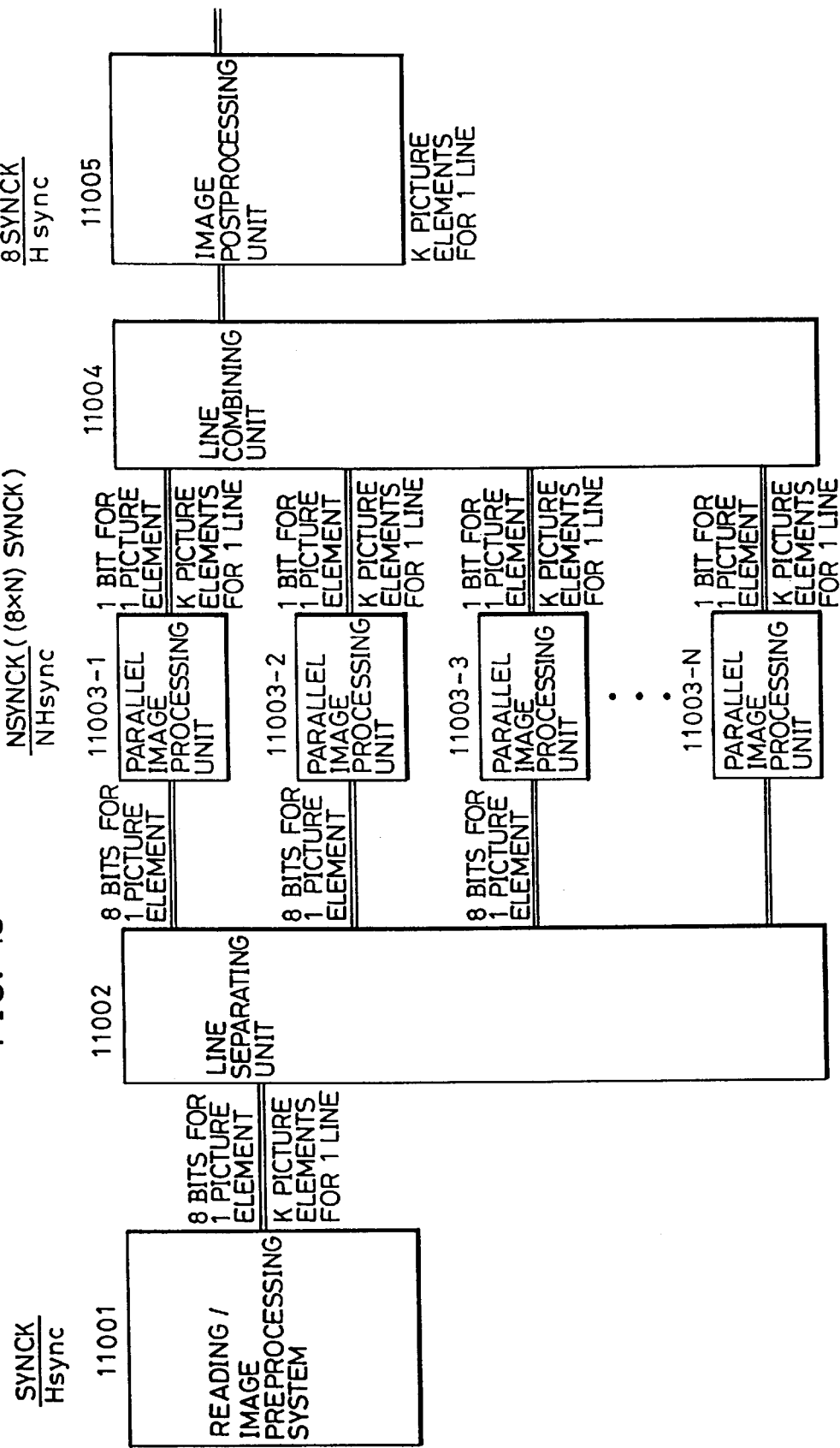
FIGS. 45 and 46 are block diagrams showing image processing apparatuses including plural parallel image processing units.

Consider that two or more parallel image processing units are provided. FIG. 45 is a block diagram showing N parallel image processing units.

It is assumed here that a synchronizing signal SYNCK for one picture element and a synchronizing signal $\overline{\text{Hsync}}$ for one line are synchronized with each other in a reading/image processing system 11001, to image-process every picture element read by image sensors. Assuming that t1 and t2 represent cycles of the signals SYNCK and $\overline{\text{Hsync}}$, the following relational expression is obtained:

$$t2 = t1 \times K \quad (24)$$

where K represents the number of image data image-processed in a main scanning direction.

After a line separating unit 11002, it is possible to simultaneously image-process N lines due to the N parallel image processing units. A cycle t2' of the line synchronizing signal is as follows:

$$t2' = Nt2 \quad (25)$$

The number K of data to be image-processed every line remains unchanged, and hence a time required for image-processing every picture element, i.e., a cycle t1' of the synchronizing signal for image processing is as follows:

$$t1' = t2'/K = Nt1 \quad (26)$$

Namely, the synchronizing signals may be N times in cycle and 1/N in frequency as compared with those in advance of the line separating unit 11002.

After the binarization (including pseudo gradation) processing, the synchronizing signals may be 8N times in cycle and 1/(8N) in frequency, similarly to the case of FIG. 44.

Finally, consideration is given to a time for processing one line and a cycle of the synchronizing signal for one picture element after binarization following line combining. It is necessary to process odd and even lines in a time-series manner. Therefore, a time to process image data of one line is identical to that before line separation, i.e., t2. As to the synchronizing signal after the line combining, therefore, a time required for image-processing binarized picture elements in units of eight bits is considered as follows:

$$t1'' = t2/K \times 8 = 8t1 \quad (27)$$

When line combining is performed after binarization, the cycle of the synchronizing signal in units of eight picture elements may be eight times that before line combining, i.e., a ⅛ frequency.

Figure 46:
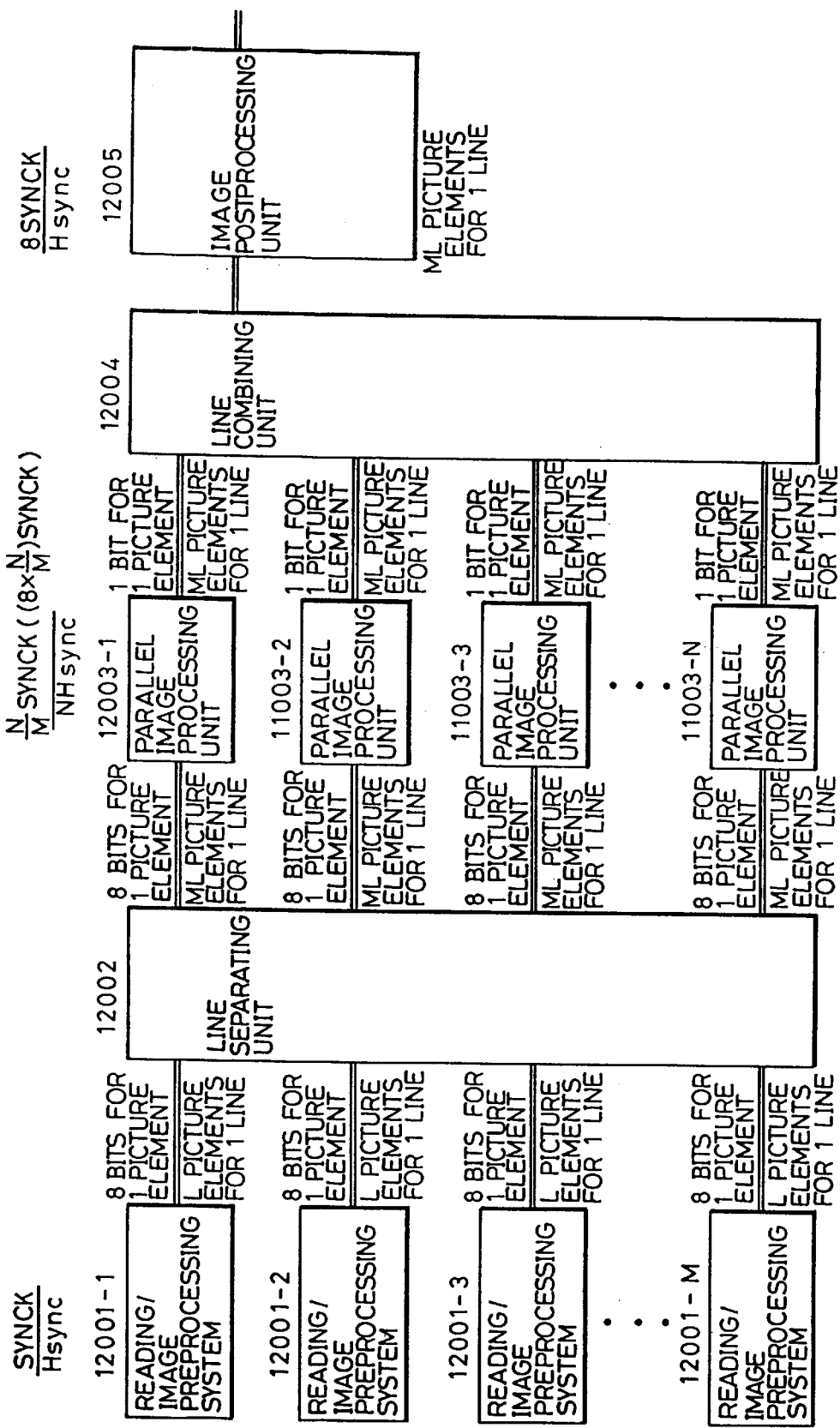

Consideration is given to a modification of the structure shown in FIG. 45, provided with M reading/image preprocessing systems. FIG. 46 is a block diagram showing an image reader provided with M reading/image preprocessing systems and N parallel image processing units.

It is assumed here that a synchronizing signal SYNCK for one picture element and a synchronizing signal $\overline{\text{Hsync}}$ for one line are synchronized with other in each of the M reading/image processing systems, to image-process every picture element read by the image sensor. Assuming that t1 and t2 represent the cycles of the signals SYNCK and $\overline{\text{Hsync}}$ respectively, the following relational expression is obtained:

$$t2 = t1 \times L \quad (28)$$

where L represents the number of image data image-processed in the main scanning direction.

A line combining/line separating unit 12002 integrates image data read by the M reading/image preprocessing systems into a single line which is formed by ML picture elements, while simultaneously dividing the same into lines formed by ML picture elements. After the processing in the line combining/line separating unit 12002, it is possible to simultaneously image-process N lines due to the N parallel image processing units. A cycle t2' of the line synchronizing signal is expressed as follows:

$$t2' = Nt2 \quad (29)$$

Since ML data must be image-processed every line, a time capable of image-processing every picture element, i.e., a cycle t1' of the synchronizing signal for image processing is as follows:

$$t1' = t2'/(ML) = N/Mt1 \quad (30)$$

Namely, the synchronizing signals may be N/M times in cycle and M/N in frequency as compared with those in advance of the line combining/line separating unit 12002.

After binarization (including pseudo gradation) processing, the synchronizing signals may be 8N/M times in cycle and 1/(8N/M) in frequency, similarly to the case shown in FIG. 44.

Finally, consideration is given to a time for processing one line and the cycle of a synchronizing signal for one picture element after binarization following line combining. It is necessary to process odd and even lines in a time-series manner. Therefore, a time to process image data of one line is identical to that before line separation, i.e., t2. As to the synchronizing signal after the line combining, therefore, a time required for image-processing binarized picture elements in units of eight bits is considered as follows:

$$t1''=t2/(ML)\times 8=8t1/M \tag{31}$$

When line combining is performed after binarization, the cycle of the synchronizing signal in units of eight picture elements may be 8 times that before line combining, i.e., a ⅛ frequency.

The times t1', t2', t1" and t2" shown in FIGS. 44, 45 and 46 are compared with each other.

Substitution of M=1 into the equation (30) gives the equation (26), while substitution of M=1 and N=2 gives the equation (22).

The equation (28) is identical to the equation (25), and substitution of N=2 gives the equation (21).

Substitution of M=1 into the equation (31) gives the equation (20), while substitution of M=1 and N=2 gives the equation (23).

Namely, the second embodiment can be regarded as an example of the block diagram shown in FIG. 46.

On the other hand, recently developed is a laser beam printer or a computer which can process a picture element in eight bits (256 gradations). No binarization (including pseudo gradation) is required for such an apparatus. In this case, the image data can be outputted to an external unit in a line-separated state with no problem.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image reading apparatus comprising:

a plurality of image sensors, each of said plurality of image sensors including a plurality of photodetectors, each photodetector sensing a picture element;

a plurality of A-D converters provided in correspondence to said image sensors, each respective one of said A-D converters converting analog signals received from a corresponding one of said image sensors into digital image data;

a plurality of separating means provided in correspondence to said A-D converters, each respective one of said separating means separating digital image data received from a corresponding one of said A-D converters into digital image data for odd numbered picture elements and digital image data for even numbered picture elements and outputting the same;

first coupling means for coupling said digital image data for said odd picture elements received from said plurality of separating means into an integrated image data and outputting the same;

second coupling means for coupling said digital image data for said even picture elements received from said plurality of separating means into an integrated image data and outputting the same;

first image processing means for processing said integrated image data outputted by said first coupling means; and second image processing means for processing said integrated image data outputted by said second coupling means.

2. An image reading apparatus in accordance with claim 1, wherein said first image processing means binarizes said integrated image data outputted by said first coupling means and wherein said second image processing means binarizes said intergrated image data outfutted by said second coupling means.

3. An image reading apparatus in accordance with claim 1, wherein said first image processing means dither-processes said integrated image data outputted by said first coupling means and wherein said second image processing means dither-processes said integrated image data outputted by said second coupling means.

4. An image reading apparatus in accordance with claim 1, further comprising:

a memory for storing image data outputted from said plurality of separating means and outputting the image data to the first coupling means and the second coupling means.

5. An image reading apparatus for reading an original image in a main scanning direction and in a subscanning direction intersecting with said main scanning direction, said image reading apparatus comprising:

a plurality of image sensors, each of said plurality of image sensors including a plurality of photodetectors, each photodetector sensing a picture element;

a plurality of A-D converters, each respective one of said plurality of A-D converters being connected to a respective one of said image sensors for converting output signals from said image sensors into digital image data;

a plurality of odd data storage means, each respective one of said plurality of odd data storage means being connected to a respective one of said A-D converters for storing odd ones of said image data outputted from said A-D converters;

a plurality of even data storage means, each respective one of said plurality of even data storage means being connected to a respective one of said A-D converters for storing even ones of said image data outputted from said A-D converters;

first coupling means for coupling the image data stored in said plurality of odd data storage means into one integrated odd image data and outputting the same;

second coupling means for coupling the image data stored in said plurality of even data storage means into one integrated even image data and outputting the same;

first processing means for processing the integrated odd image data outputted from said first coupling means and for outputting first processed image data;

second processing means for processing the integrated even image data outputted from said second coupling means and for outputting second processed image data; and means for combining said first processed image data outputted from said first processing means with said second processed image data outputted from said second processing means so as to reconstruct an entire set of image data for one line of the original image.

6. An image reading apparatus in accordance with claim 5, further comprising a plurality of magnification varying means, each one of said magnification varying means being connected to a respective one of said A-D converters, wherein said digital image data corresponds to an image area, and wherein said magnification varying means varies a size of said image area of said digital image data outputted from a respective one of said A-D converters, said magnification varying means inputting into said odd and even data storage means the thus magnificationally varied digital image data.

7. An image reading apparatus in accordance with claim 5, further comprising shift means for shifting the image data being stored in said odd data storage means and said even data storage means and for inputting into said first and second data coupling means the thus shifted image data.

8. An image reading apparatus in accordance with claim 5, wherein said first and second processing means perform binarization processing.

9. An image reading apparatus in accordance with claim 8, wherein said first and second processing means perform dither processing.

10. An image reading apparatus comprising:

a plurality of image sensors, each of said plurality of image sensors including a plurality of photodetectors for reading picture elements of an original image and for outputting analog signals corresponding to the respective picture elements;

a plurality of A-D converters, each one of said A-D converters being connected to a respective one of said image sensors for converting the respective analog signal into digital image data;

a plurality of separators, each one of said separators being connected to a respective one of said A-D converters for separating digital image data for a line in the main scanning direction into an odd number picture element block and an even number picture element block;

a memory storing dither matrices;

a first processor for pseudo tone processing of the odd number picture element block with threshold values of an odd number set of the dither matrices;

a second processor for pseudo tone processing of the even number picture element block with threshold values of an even number set of the dither matrices; and an output unit for receiving the image data from said first and second processors in turn and for outputting binary image data corresponding to picture elements of the original image.

11. An image reading apparatus in comprising:

a line sensor to read image data line by line and to serially output analog image data;

an A-D converter to serially convert the outputted analog image data into serial digital image data;

a first memory for storing digital image data of at least four lines;

a line separation device for sequentially writing said serial digital image data to said first memory and for sequentially outputting in a plurality of groups said image data stored in said first memory, including one group consisting of image data of two lines;

a plurality of image processing devices, each of said plurality of image processing devices connected to said first memory for processing a respective one of said plurality of groups of said image data outputted from said first memory;

a second memory for storing digital image data of at least four lines; and an output control device for receiving said processed groups of image data processed by said plurality of image processing devices, storing said processed groups of image data in said second memory, and for outputting said image data line by line from said second memory.

12. An image reading apparatus in accordance with claim 11, wherein said image processing circuits execute binarization processing.

13. An image reading apparatus in accordance with claim 11, wherein said image processing circuits execute dither processing.

14. An image processing apparatus comprising:

a plurality of line sensors provided in a main scanning direction, each of said line sensors for outputting analog image data in parallel;

a plurality of A-D converters, each A-D converter connected to one of said plurality of line sensors for converting analog image data to digital image data;

a memory for storing one line of said digital image data outputted from said plurality of A-D converters;

separating means for separating said one line of said digital image data stored in said memory into a plurality of separated groups and for simultaneously outputting said separated groups of image data, said separated groups being different from groups of image data outputted from said plurality of line sensors;

a plurality of image processing means for processing image data in said plurality of separated groups, each of said plurality of image processing means corresponding to one of said plurality of separated groups; and output control means for receiving, combining and outputting image data processed by said plurality of image processing means.

15. An image processing apparatus in accordance with claim 14, wherein said separating means separates said one line of said digital image data into image data for an odd numbered group and image data for an even numbered group in a main scanning direction.

* * * * *